(12) United States Patent
DiDomenico

(10) Patent No.: US 7,924,495 B1
(45) Date of Patent: Apr. 12, 2011

(54) ACTIVE-MATRIX SUN TRACKER

(75) Inventor: Leo David DiDomenico, Livermore, CA (US)

(73) Assignee: Xtreme Energetics, Inc., Livermore, CA (US)

( * ) Notice: Subject to any disclaimer, the term of this patent is extended or adjusted under 35 U.S.C. 154(b) by 254 days.

(21) Appl. No.: 12/156,699

(22) Filed: Jun. 3, 2008

Related U.S. Application Data

(60) Provisional application No. 60/933,068, filed on Jun. 4, 2007.

(51) Int. Cl.
*G02F 1/29* (2006.01)

(52) U.S. Cl. ...................................................... 359/316

(58) Field of Classification Search .................. 359/196, 359/237, 298, 315, 316
See application file for complete search history.

(56) References Cited

U.S. PATENT DOCUMENTS

| | | | |
|---|---|---|---|
| 5,585,683 A | 12/1996 | Higuchi | |
| 5,717,515 A | 2/1998 | Sheridon | |
| 5,754,332 A | 5/1998 | Crowley | |
| 5,808,783 A | 9/1998 | Crowley | |
| 5,869,916 A | 2/1999 | Suzuki | |
| 5,914,805 A | 6/1999 | Crowley | |
| 5,940,054 A | 8/1999 | Harris | |
| 5,965,968 A | 10/1999 | Robert et al. | |
| 6,612,705 B1 | 9/2003 | Rabinowitz | |
| 6,657,359 B1 | 12/2003 | Hoen et al. | |
| 6,698,693 B2 | 3/2004 | Rabinowitz | |
| 6,957,894 B2 | 10/2005 | Rabinowitz | |
| 6,964,486 B2 | 11/2005 | Rabinowitz | |
| 6,987,604 B2 | 1/2006 | Rabinowitz | |
| 6,988,809 B2 | 1/2006 | Rabinowitz | |
| 7,077,361 B1 | 7/2006 | Rabinowitz | |
| 7,112,253 B2 | 9/2006 | Rabinowitz | |
| 7,130,102 B2 | 10/2006 | Rabinowitz | |
| 7,133,183 B2 | 11/2006 | Rabinowitz | |

OTHER PUBLICATIONS

Web Site: http://www.aml.t.u-tokyo.ac.jp/research/es_motor/pim_e.html.

*Primary Examiner* — Jessica T Stultz
*Assistant Examiner* — Mahidere S Sahle
(74) *Attorney, Agent, or Firm* — Leighton E. Chong

(57) ABSTRACT

This invention deals with the general topic of adaptive electronic redirection of sunlight by means of an active matrix of transistors, electrodes, and optical elements. The scale of the system may range from small portable systems to large-scale arrays for industrial processes such as solar power plants used for the production of environmentally benign energy. It may be integrated directly into buildings and other platforms without the need for heliostats to hold photovoltaic cells or other energy conversion devices above the building or other host platform. It makes solar energy harvesting systems practical by allowing the separation of tracking, collection, concentration, aggregation, distribution, and energy conversion. This novel system is unique and distinct from other sun tracking and energy conversion systems because it allows adaptive solid-state electronics to be used in place of conventional mechanical tracking heliostats. Furthermore, it is highly precise and therefore allows very high levels of concentration to be achieved in a dynamic environment. It is also cost effective because it leverages integrated opto-electronics to perform sun tracking.

18 Claims, 14 Drawing Sheets

US 7,924,495 B1

ACTIVE-MATRIX SUN TRACKER

CROSS-REFERENCE TO RELATED APPLICATIONS

This invention claims the benefit of U.S. provisional patent application: U.S. 60/933,068 filed by the inventor, Leo D. DiDomenico, on 2007 Jun. 4 and entitled Light Tracking-Concentrator. U.S. provisional patent application 60/933,068 is hereby incorporated in the present disclosure in its entirety and for all purposes in this patent disclosure.

FEDERALLY SPONSORED RESEARCH

Not Applicable

SEQUENCE LISTING OR PROGRAM

Not Applicable

BACKGROUND OF THE INVENTION

1. Field of the Invention

The world's supply of oil, natural gas, coal, and uranium are becoming depleted due to exponential growth in population and the need for every greater amounts of energy to satisfy the resulting economic growth. Furthermore, the pollution from the widespread use of these fuels has caused tremendous concern over the possibility of catastrophic widespread and irreversible environmental damage, such as, but not limited to, global warming. Clearly there is a limit to growth in a world constrained by finite resources and a finite ability of the environment to absorb the pollution of human activities. To help overcome the limitations of conventional fuels the use of the energy from our sun would appear to offer many advantages, such as its pollution free quality and its pervasive global distribution, if only it could be harvested in a cost effective and efficient way using devices that only require a relatively small investment in energy and pollution for their manufacture. This invention directly addresses the problem of creating an efficient, low-cost, and easily manufacturable solar tracker and collector, thereby providing a means to directly tap the energy resources of the sun by augmenting the performance of solar concentrators by replacing conventional mechanical sun trackers with a solid-state electro-optic sun tracker that is capable of adapting to changing environmental lighting conditions.

In general, solar concentrators increase the flux of solar energy through a given area. This in turn can be used to maximize the power output of a thermal or photovoltaic cell, which are significantly and nonlinearly improved in performance when irradiated by intense sunlight. Specially designed solar cells, which are optimized for use in intense sunlight, are capable of producing more output power than a large area of solar cells at a lower concentration due to the increased quantum efficiency of the cells in this intense light environment. Concentrators also provide a means to confine solar energy into a small cross-sectional area light-guide, thereby making solar energy distribution practical for a variety of uses. Unfortunately, solar concentrators have an intrinsically narrow field of view that diminishes with increasing concentration. This necessitates the use of some kind of tracking device to follow the sun's motion.

More specifically, the present invention relates to the field of electronically controllable and adaptable solid-state solar trackers that are based on predominantly flat optical boundaries which refract, reflect, or diffract the sunlight and have a reconfigurable orientation. The active optical boundary provides a means to direct light into a desired direction for the purpose of collection, concentration, distribution, and conversion of the sunlight into other end-use energy products.

Furthermore, this type of solar tracker is less expensive and less resource intensive to manufacture than large mechanical solar tracker, which can often be larger than a bus in size. That is, the solid-sate tracking mechanism described herein dramatically reduces the balance of the conversion systems costs not directly associated with the photovoltaic solar cell. The present invention is solid-state, has a very thin profile allowing it to cover large areas of structures such as, but not limited to, buildings aircraft, satellites, ocean vessels, and solar farming structures. Additionally, this invention allows the use of the best-of-breed in solar concentrator optics and concentrating solar cells or it can even be used as a stand-alone concentrator technology. Its versatility and adaptability make it an ideal candidate for small-scale domestic solar energy applications or large-scale industrial power-plants.

2. Description of the Prior Art

There are several recent efforts to adapt a twisting ball concept for use in solar energy collection and concentration. Additionally, there are many patents that explicitly show the use of twisting balls, called gyricons, for use in electronic paper and display technology. No prior art appears to actuate these optical structures by means of controlled electro-static manipulation utilizing active matrix arrays—as described herein.

Both the solar twisting ball concept and the gyricons used in displays are active devices that rotate either a ball or cylinder by use of electric or magnetic fields with the intent of utilizing these rotating structures in either diffuse or specular reflection. Much emphasis has been placed on the use of a quasi-electrostatic drive of the twisting balls and cylinders due to the ability for low power draw. Unfortunately, much of the prior art shows electrostatic motors with high complexity, low precision, and relatively high power dissipation even though the electrostatic motor technology has a longer history than the magnetic induction motor. Indeed, the first simple electrostatic motors were actually developed in the 1750's by Benjamin Franklin and Andrew Gordon. Subsequently, electret based electrostatic motors were invented in 1961 by a Russian physicist, A. N. Gubkin. His motor is based on an electret materials made in 1922 by Mototaro Eguchi, professor of physics at the Higher Naval College in Tokyo. Many different embodiments have evolved since the original principle was reported none of which teaches or anticipates the use of the electrostatic motor for controlling a transmission mode solar tracking device as described in this invention.

The disadvantages listed below apply to many inventions. However, the disadvantages listed below are especially pertinent with regard to the inventions of Mario Rabinowitz et. al. and Toshiro Higuchi et. al., that are explicitly listed later in this document.

The first disadvantage of the prior art is that it mimics the functionality of large curved surface reflectors, such as mirrored parabolic concentrators, which require a mast structure at the focal point to hold the receiver and collect the concentrated solar radiation. This mechanical mast structure adds unnecessary costs to the conversion system and is not compatible with compact integrated solar energy collection, concentration, and distribution devices.

The second disadvantage of the prior art is that the mirror technology used is based on thin metallic films which are sandwiched between an upper and lower hemisphere of transparent dielectric. These metallic films are very difficult to manufacture with low ohmic losses. The result is that any practical metallic mirror will typically have losses that can range from about 2% to 20% depending on the process used and the resulting purity of the metal and its surface roughness. The lower loss mirrors cost significantly more to fabricate, especially when incorporated into very small dielectric balls or cylinders.

A third disadvantage of the prior art is that the metallic mirrors also interact with the switching electric fields to produce ohmic losses via eddy currents. Although the power loss in an individual twisting ball is tinny, the total loss from many millions of twisting balls can be quite large. This reduces the efficiency of the overall solar harvesting process.

A fourth disadvantage of the prior art is that it requires significant currents to induce the required electric fields to twist large numbers of balls and embedded mirrors over large distances. The prior art attempts to overcomes this difficulty by periodically resetting the twisting balls in order to track the sun instead of maintaining a controlled electromagnetic field. However, this requires that the prior art have two modes. The first mode is the dynamic mode where in the twisting balls are moved in accordance with the applied electric fields. The second mode is a mechanical stabilization mode where mechanical forces are applied to hold the twisting balls between dynamic updates. The mechanical stabilization is achieved by one of a number of possible techniques, such as but not limited to, piezo-electrics, fluid pressure, and ancillary electric or magnetic moments that are engaged to produce forces for the stabilization mode. Furthermore, because all the driving electrodes are typically quite far from the moving structures large voltage supplies are required.

A fifth disadvantage of the prior art is that it does not adequately address the problem of pointing accuracy or pointing precision. Pointing accuracy is related to the absolute error in solar tracking and pointing precision is related the relative error in solar tracking. The accuracy and the precision of orientating balls or cylinders, and hence redirecting light, directly impacts the performance of the subsequent solar concentration process due to the limitations imposed by the principle of conservation of etendue—which is based on a phase space approach to light focusing dynamics. The prior art is useful only for the relatively low pointing accuracies needed for concentrations on the order of 10 suns. That is 10 times the normal one sun concentration. In applications that require concentrations that are on the order of 1000 suns, 10,000 suns, or even as high as about 100,000 suns—which is near the thermodynamic limit of concentration in a homogenous, isotropic, and linear dielectric medium—a more robust means of providing the required pointing accuracy and precision is needed. Additionally, a means must exist to overcome the segmented nature of light redirected from a discrete twisting ball. This discrete nature of reflection mode twisting balls and cylinders tends to limit the maximum achievable concentration when arrays of twisting structures attempt to directly focus light to a common focal point directly. Such focusing problems would not exist if the array of twisting mirrors used in the prior art only were used to redirect the input light so that an intermediary high-performance solar concentrator could be used to perform the concentration. The prior art neither teaches nor discusses this important issue for high performance solar concentration.

A sixth disadvantage of the prior art, especially with regard to electrostatic motors, is that it shows electrostatic stepping-motor actuation based on a limited number (typically three) phases of interdigitated electrodes on a single stator. In principle, by increasing the number of phases there is more control over the actuated optics—as discussed in this document.

A seventh disadvantage of the prior art, especially with regard to electrostatic motors, is that it shows electrostatic stepping-motors that do not optimally utilize the electrode geometry. In particular, for a given pitch between electrodes an optimal resolution of travel of only one pitch length should be achievable in theory. The prior art does not achieve this theoretical limit and therefore wastes precious area resources needlessly.

An eighth disadvantage of the prior art, especially with regard to electrostatic stepping motors, is that it does not integrate optics into the functionality of the stator, rotor, or slider.

It also appears that none of the prior art associated with display technology utilizes twisting balls or cylinders to optically concentrate, or focus, light using transmission mode, also called refraction mode, optics, as is done in this present invention. Furthermore, the prior art neither teaches nor anticipates the use of active matrix actuation for properly orientating optical elements.

The following are a list of the issued patents that use twisting ball or cylinder technology (gyricons) explicitly for solar concentration. These patents clearly do not anticipate, or show in any way, the use of active matrix techniques for controlling the orientation of an optical device, such as a twisting ball or cylinder.

U.S. Pat. No. 6,612,705 issued to Mark Davidson and Mario Rabinowitz on Sep. 2, 2003 deals with reflection mode mini-optic twisting balls and twisting cylinders that use metallic mirrors for reflection and electric and magnetic addressing.

U.S. Pat. No. 6,698,693 issued to Mark P. Davidson and Mario Rabinowitz on Mar. 2, 2004 deals with solar propulsion assist using reflection mode mini-optic twisting balls and twisting cylinders.

U.S. Pat. No. 6,957,894 issued to Mario Rabinowitz on Oct. 25, 2005 deals with group alignment of reflection mode micro-optic twisting balls and twisting cylinders using induced electric dipoles.

U.S. Pat. No. 6,964,486 issued to Mario Rabinowitz on Nov. 15, 2005 deal with alignment of reflection mode solar concentrator micro-mirrors by augmentation induced electric dipoles with permanent electric dipoles.

U.S. Pat. No. 6,987,604 issued to Mario Rabinowitz and David Vincent Overhauser on Jan. 17, 2006 deals with manufacture of low friction rotatable arrays of reflection mode micro-optic twisting balls and twisting cylinders.

U.S. Pat. No. 6,988,809 issued to Mario Rabinowitz on Jan. 24, 2006 deals with reflection mode solar concentration systems using micro-optic twisting balls and twisting cylinders.

U.S. Pat. No. 7,077,361 issued to Mario Rabinowitz on Jul. 18, 2006 deals with reflection mode micro-optics concentrator systems for solar power satellites.

U.S. Pat. No. 7,112,253 issued to Mario Rabinowitz on Sep. 26, 2006 deals with manufacturing reflection mode mini-balls for solar energy concentrators and related applications.

U.S. Pat. No. 7,130,102 issued to Mario Rabinowitz on Oct. 31, 2006 deals with reflection illumination and projection systems that use reflection mode mini-balls having metallic mirrors.

U.S. Pat. No. 7,133,183 issued to Mario Rabinowitz on Nov. 7, 2006 deals with reflection mode micro-optics solar concentrators based on mini-optic twisting balls and twisting cylinders that use metallic mirrors for reflection and electric and/or magnetic addressing.

There are also serious disadvantages and fundamental distinctions of kind associated with other patents that use twisting balls in display technology. These technologies are called by various names such as electronic-paper, e-paper, or gyricon. It appears that none of the prior art associated with display technology utilizes the twisting balls to optically concentrate, or focus, light as is done in this present invention. Furthermore, the prior art neither teaches nor anticipates the use of optical transmission mode twisting ball or cylinder technology in for solar energy conversion applications. The following is a representative sample from the large body of gyricon and gyricon-like patents used in display technology.

U.S. Pat. No. 5,717,515 issued to N. K. Sheridon on Feb. 10, 1998 deals with gyricon display technology.

U.S. Pat. No. 5,754,332 issued to J. M. Crowley on May 19, 1998 deals with gyricon two-colored twisting balls having reflectance comparable to white paper for monolayer gyricon displays.

U.S. Pat. No. 5,808,783 issued to J. M. Crowley on Sep. 15, 1998 deals with gyricon two-colored twisting balls having high reflectance properties for use as a white paper replacement.

U.S. Pat. No. 5,914,805 issued to J. M. Crowley on Jun. 22, 1999 deals with the use of two sets of gyricon two-colored twisting balls with enhanced reflectance properties.

U.S. Pat. No. 5,940,054 issued to Ellis D. Harris on Aug. 17, 1999 deals with the use of the friction induced electric charges (Triboelectric effect) on optical elements to the purpose of inducing motion of the optical elements.

U.S. Pat. No. 6,055,091 issued to N. K. Sheridon and J. M. Crowley on Apr. 25, 2000 and shows the use of gyricon two-color cylinders for electronic displays.

U.S. Pat. No. 6,072,621 issued to E. Kishi, T. Yagi, and T. Ikeda on Jun. 6, 2000 and shows how sets of different single-colored polarized twisting balls can be use in a display device.

U.S. Pat. No. 6,097,531 issued to N. K. Sheridon on Aug. 1, 2000 describes a method for constructing magnetized twisting balls or cylinders for gyricon displays.

U.S. Pat. No. 6,120,588 to J. M. Jacobson on Sep. 19, 2000 shows an electronically addressable single color display.

U.S. Pat. No. 6,174,153 issued to N. K. Sheridon on Jan. 16, 2001 describes an addressable gyricon display.

U.S. Pat. No. 6,192,890 B1 issued to D. H. Levy and J. P. F. Cherry on Feb. 27, 2001 describes a reconfigurable display sign using magnetic and electric fields to reorient the particles in the display.

There are also serious disadvantages in the prior art of electrostatic motors. The prior art is either too complex, or does not have sufficient resolution for high-performance concentration.

U.S. Pat. No. 4,754,185 issued to Kaigham J. Gabriel, Robert K. Prud'Homme and William S. N. Trimmer on Jun. 28, 1988 describes an electrostatic actuator having electrodes on both the stator and rotor.

U.S. Pat. No. 5,585,683 issued to Toshiro Higuchi, Saku Egawa, Massao Hiyane, and Katsuhide Natori on Dec. 17, 1996 describes an electrostatic actuator having a plurality of belt-like electrodes positioned only on the stator or only on the rotor, which are driven with three or more voltage pulsed phases, wherein at least one of the phases is needed for avoiding an unpredictable bi-stable state found in systems composed of only two voltage driving phases. This meta-stable state causes the direction of travel of any of the actuators described therein to be indeterminate without at least a third set of electrodes, having a direction discriminating voltage. These direction discriminating electrodes are periodic and are intermingled with the other belt-like electrodes. The phases and function of each set of electrodes permutating with each discrete step of said electrostatic stepping motor. This prior art neither teaches or anticipates any techniques to avoid the meta-stable state by using other techniques other than one or more sets of periodic belt-like electrodes intermingled the other electrodes. This problem is directly addressed in the current invention in the context of a movable transmission mode optical device for solar tracking.

U.S. Pat. No. 5,869,916 issued to Hidetoshi Suzuki and Takeshi Tanaka on Feb. 9, 1999 describes an electrostatic actuator having electrodes on both the stator and rotor.

U.S. Pat. No. 5,965,968 issued to Phillippe Robert, Jean-Sebastien Danel, and Bernard Diem on Oct. 12, 1999 describes an electrostatic actuator driven by deformation waves induced by electric fields.

U.S. Pat. No. 6,657,359 issued to Storrs Hoen and Carl Taussig on Dec. 2, 2003 describes an electrostatic actuator having electrodes on both the stator and rotor.

In summary, there are a large number of prior art devices that are currently using a twisting ball or cylinder geometry for either display technology or for reflection mode solar concentration. However, none of these teaches or anticipates the present invention of transmission mode solar tracking and transmission mode concentration. Additionally, there are a large number of prior art electrostatic actuation devices but most of these are based on electrodes on both the stator and the rotor; additional deficiencies of the prior art include complexity due to a need to suppress a bi-stable state that makes direction of motor displacement impossible to determine without a means to force a predetermined direction of motion. Thus the prior art described above is seen to have multiple deficiencies. These deficiencies are addressed and overcome in this patent.

DEFINITIONS

"Angle-Tracking" as used herein refers to the process of mapping the acceptance angle of a solar concentrator into the solid angle subtended by the sun. This type of tracking allows the receiver to remain fixed relative to the sun while still allowing high levels of concentration. The cosine roll-off of power still exists but the form of the receiver may now be integrated into structures such as building or satellites without the need for bulky and costly heliostats.

"Area-Tracking" as used herein refers to the process of keeping the area of an input aperture of a solar receiver directly in front of the sun. This minimizes the cosine roll-off of power due to geometry. It also requires large mechanical structures to physically move in order to maintain the optimum geometric configuration.

"Collection" as used herein refers to the optical process of gathering solar energy into an optical system. It is separate and distinct from aggregation, concentration, distribution, and energy conversion processes.

"Concentration" as used herein refers to the optical process of increasing the flux, or flow, of light through a given area. In solar applications it is often given in terms of the number of suns of equivalent flux, where unity concentration or one sun of concentration is equivalent to 1000 Watts per square meter. It is separate and distinct from collection, aggregation, distribution, and energy conversion processes.

"Distribution" as used herein refers to the process of routing light, which is passing through a common input cross sectional area, and guiding it to a common output cross sectional area. It is separate and distinct from aggregation, collection, concentration, aggregation, distribution, and energy conversion processes.

"Electret" refers to a solid dielectric maintaining a persistent electric polarization independent of external polarization inducing electric fields. It is the direct electric field analog of a magnet, which is based on magnetic fields.

"Electrostatic Motor" refers to a type of motor that uses attraction and repulsion of electric charges. The dynamics of the charges involved are often only quasi-static and it typically requires high voltage at low currents. These motors can be made with either permanent electrets or by inducing charges by the application of voltages.

"Etendue" as used herein refers to a physical constant of an optical system which determines the relation of concentrated area and solid-angle extent as light propagates. It is mathematically the integrated 6-dimensional volume that a bundle of rays traverses in a momentum phase space. This is approximately the product of the solid-angle of light-cones, which are defined by the angular extent of light at a point, at a given physical or mathematical aperture times the area of the aperture. If a non-imaging optical system is incorrectly designed then it will have a different etendue as a function of position resulting in the rejection of any input light.

"Heliostat" refers to a clock-driven mounting with varying types of mechanical linkages used to support and aim for a solar collector. This mounting continuously and automatically tracks the sun by imposing physical motion over the entire solar collector structure.

"Light-Cone" as used here in refers to a bundle of rays filling a cone and having a common mathematical source point located at the apex of a cone. Such a bundle of rays can be defined at each point of an optical system and the solid-angle subtended by this cone is related to the cross sectional area of the optical system through the physical constant called the etendue. Concentrators must accept light of a specific solid-angle centered on a specific input direction as input if the concentrator is to perform its function of concentrating light. If the solid-angle of a cone of rays, or the direction about which a cone of rays is prescribed, is not optimally chosen than light will be rejected from the concentrator. The present patent manipulates the light cone geometry to allow concentration under a wide range of sunlight input conditions.

"Null Refraction" as used herein refers to a refraction process that does not change the direction of a light ray after the optical interaction but may induce a relative physical offset or translation of the ray of light. Such a process leaves the optical momentum unchanged.

"Optical Momentum" is the product of the magnitude of a single photon's intrinsic quantum momentum, the local refractive index, and the unit vector tangent to the path of the photon and corresponding to the direction of a ray.

"Pitch" as used herein refers to the distance between adjacent electrodes. This distance may be the same from electrode to electrode or it may be variable.

"Reflection Mode" as used herein refers to the optical process of using a twisting ball or cylinder with an embedded mirror to reflect incoming solar energy.

"Rotor" as used herein refers to the moving part of a motor, or that part which by convention is considered to be moving, without regard to the geometry of the moving part, i.e. it may be a twisting ball, a twisting cylinder, or a block of material moved in linear translation—which is sometimes called a slider. A rotor may also have useful optical properties.

"Slider" as used herein refers to the moving part of a linear motor, or that part which by convention is considered to be moving with linear or angular translation. This term shall sometimes be used when more specificity is needed than the general term: rotor. A slider may also have useful optical properties.

"Solar Cells" as used herein refers to either thermal or photovoltaic cells made from one or more various materials that directly covert photonic energy into electricity.

"Stator" as used herein refers to the stationary part of a linear motor, or that part which by convention is considered to be stationary. In the present invention it may be the electrodes that surround a twisting ball or twisting cylinder, which are called rotors. A stator in the present invention may also control the actuation of more than a single rotor in an array of rotors. A stator may also have useful optical properties.

"Stepping Motor" refers to a type of electric motor which is used when something has to be positioned very precisely or rotated by an exact angular or linear translation over small discrete steps.

"Suntenna" as used herein refers to a single optical element used for tracking the sun. It is the phase-incoherent analog of an antenna element used to make phase-coherent array antennas in coherent radiation systems.

"Suntenna Array" as used herein refers to an array of individual suntenna elements. This array may be periodic or non-periodic. It may be in one, two, or three dimensions. It may have a plurality of different suntenna device types.

"Transmission Mode" as used herein refers to the of using a twisting ball with two or more sections that allows light to flow through the balls by a process of surface or volume refraction.

"Twisting Ball" as used herein refers to a spherical ball created from one or more materials. The materials being chosen to allow optical and control properties to be embedded within the structure. An integrated twisting ball is a type of suntenna.

"Twisting Cylinder as used herein refers to a cylinder created from one or more materials. The materials being chose to allow optical and control properties to be embedded within the structure. An integrated twisting cylinder is a type of suntenna.

BRIEF SUMMARY OF THE INVENTION

There are multiple applications of the present invention, however, the primary application of this invention is solid-state solar tracking and concentration. The present invention describes a method for tracking the sunlight emitted from the sun and redirecting that light using solid-state, active-matrix electro-optics techniques for the purpose of optimally collecting and concentrating sunlight from a platform that is not intrinsically positioned for receiving the maximum solar flux from the sun. An example of such a platform is a building having a fixed roof and walls. The present invention can be mounted on or directly integrated into a building, or other platform, to make it capable of optimal solar energy conversion even though the platform cannot physically move to area-track the sun.

In particular, in the present invention a transparent rotor, having a flat optical boundary in its interior, which is positioned between two media having substantially different refractive indices, is embedded in a transparent stator having substantially matched refractive indices to that of the rotor so that sunlight traveling inside the combination of the optically transparent stator and optically transparent rotor has refraction, reflection, or diffraction at the rotor's internal optical boundary and predominantly null refraction at the interface of the rotor and stator. Thereby allowing almost all of the incident solar radiation to be redirected either to a common point for concentration or in a common direction for subsequent processing by other optical elements such as, but not limited to, a fixed light concentrator.

The optically transparent stator and the optically transparent rotor are separated by a small gap which may optionally be filled with a lubricating medium. This lubricating medium is typically chosen to have a refractive index between the refractive index of the stator and rotor. Furthermore, the gap is made very thin so that the refraction process at the curved interface region containing said gap between the rotor and stator is a almost a perfect null refraction process.

This invention shall predominantly focus on electrostatic forces induced by active matrix arrays of electrodes and transistors to actuate the optical rotor.

The combination of an optically transparent rotor, an optically transparent stator, and a means to actuate said rotor relative to said stator is called a suntenna—in analogy to a radio frequency antenna. A plurality of individual suntenna are typically combined into arrays so that large areas can be covered to collect significant amounts of sunlight.

Accordingly several objects and advantages of the present invention are:

(a) to provide a solid-state adaptive solar angle-tracking system based on refraction, reflection, or diffraction optics;
(b) to provide a means to electronically steer light by the orientation of one or more optically transparent spherical rotors using an active matrix of electrodes and transistors to impart orientation;
(c) to provide a means to electronically steer light by the orientation of one or more optically transparent cylindrical rotors;
(d) to provide a fixed-position narrow acceptance angle concentrator that may be used in applications where the light source moves relative to the receiver without the need to physically move the concentrator to directly intercept the incident light over a narrow solid acceptance angle;
(e) to provide a device that can redirect sunlight without concentrating it directly;
(f) to provide a device that can redirect sunlight while also concentrating it directly;
(g) to provide a substantially flat boundary between different refractive index media that tilts to any orientation based on the application of a suitable actuation force, such as but not limited to, electrostatic forces;
(h) to provide a device that may be arrayed onto surfaces of different geometries for the purpose of integration into a structure such as but not limited to a building or a satellite;
(i) to provide a light angle-tracker that transforms an input light-cone from a specific spatial direction into another light-cone in another spatial directed associated with the optical axis of a non-imaging concentrator;
(j) to provide a device that allows classical non-imaging concentrators to be used in a dynamic environment where they would normally require classical mechanical area-tracking to stay aligned with light source;
(k) to provide a tilting refractive surface which is controlled with voltages;
(l) to provide a tilting refractive surface which is controlled with light intensity;
(m) to provide a device to automatically angle-track a source of light, such as the sun, by the use of a feed-back control system;
(n) to provide a device to concentrate sunlight to one or more photovoltaic chips independent of the position of the Sun;
(o) to provide a device to concentrate sunlight into light guides, which are located after one or more suntenna;
(p) to provide a device to concentrate sunlight to either a photovoltaic chip or a light guide or both a photovoltaic chip and a light guide simultaneously;
(q) to provide a device to conform to a surface with a plurality of angle-trackers and a plurality of concentrators with corresponding photovoltaic cells or light guides of a combination of photovoltaic cells and light guides;
(r) to provide a means of covering a large optical concentrator with one or more suntenna;
(s) to provide a device capable of high precision tracking so that high-intensity concentration may be achieved;
(t) to provide a device that is electronically steered by an electrostatic motor with little to or no power loss;
(t) to provide a device that is electronically steered by a piezoelectric ultrasonic actuated motor with little to no power loss;
(u) to provide a device that can track the sun using consistent, reproducible, and precise digital techniques;
(v) to provide a device that can track the sun using analog techniques;
(w) to provide a device that can be used in reverse from that predominantly described in this document so that light energy generated at a particular position can be scanned to another position using the adaptive optics systems described herein.

Further objects and advantages will become apparent from a consideration of the ensuing description and drawing.

BRIEF DESCRIPTION OF DRAWINGS

The foregoing discussion and other objects, features, aspects, and advantages of the present invention will become apparent from the following detailed description of embodiments and drawings of physical principles given by way of illustration. Unless otherwise stated the figures are drawn for improved clarity of the underlying physical principles and are not to scale.

DETAILED DESCRIPTION

Figure 1:
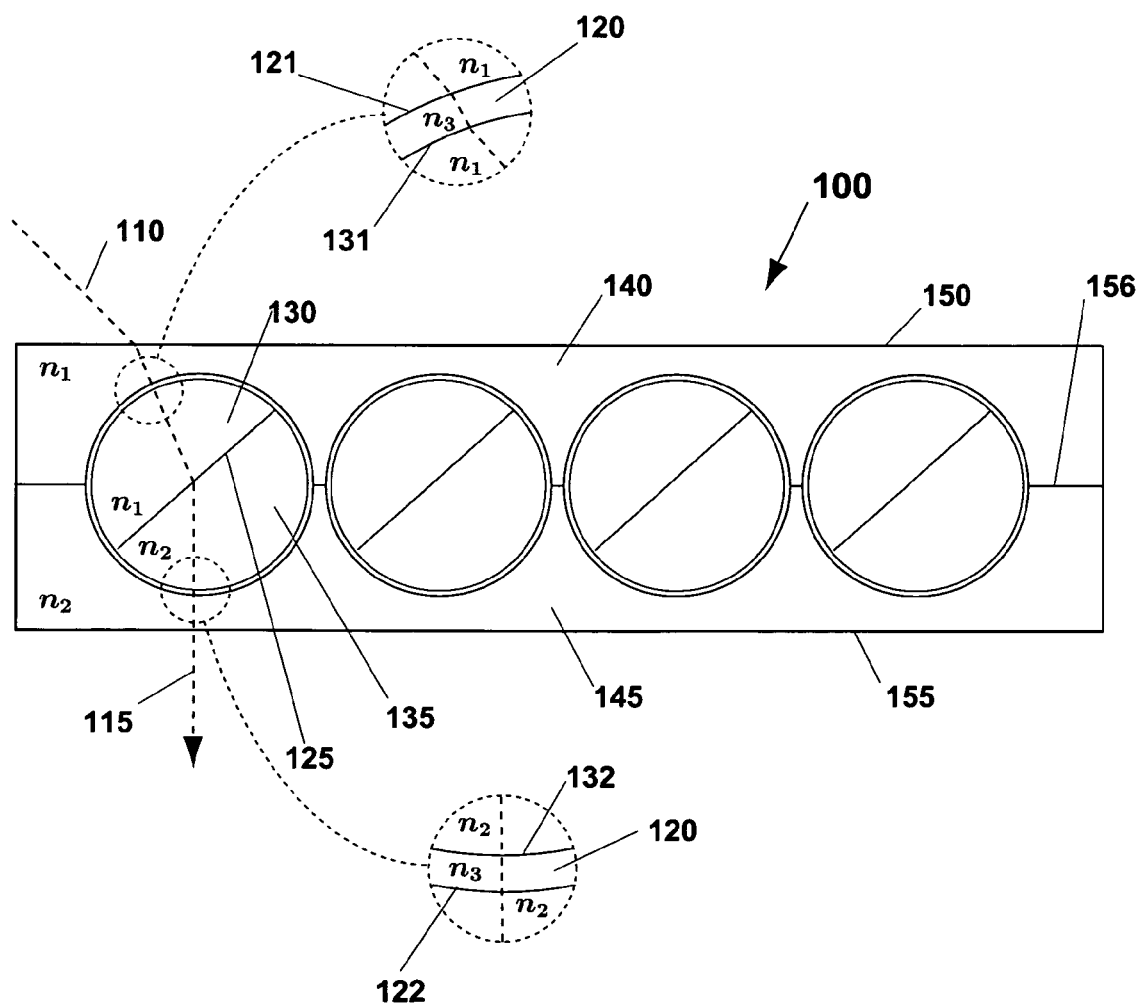
FIG. 1 shows in cross section the optical design for a transmission mode suntenna array without regard to the method for actuation of the transparent rotor.

FIG. 1 shows a small cross section of a larger array which is comprised of a plurality of suntenna elements. FIG. 1 specifically shows a section comprising four suntenna sun trackers 100. Light 110 from a remote source travels through air or vacuum and strikes a first surface 150 of a first member of an optically transparent stator 140. The first surface 150 of the first member of said stator 140 having optical coatings to suppress Fresnel reflections and to reject certain spectral components of the incident light as may be necessary. The first member of said transparent stator 140 has a volume refractive index $n_1$.

Light having passed through said first member of said transparent stator 140 then encounters a second surface 121 of the first member of said transparent stator 140. Said second surface 121 of the first member of said transparent stator 140 having optical coatings to suppress Fresnel reflections at an optional thin optically transparent fluidic lubricating layer 120 positioned between said second surface of the first member of the stator 121 and the first surface of a first member of a transparent rotor 131. The thin fluid lubricating layer 120 having refractive index $n_3$.

By means of propagation the light next encounters the first surface 131 of a first member 130 of an optically transparent rotor. Said first surface 131 of said first member of said transparent rotor 131 having optical coatings as needed to suppress Fresnel reflections.

By means of propagation the light next encounters a boundary 125 between said first member of said transparent rotor 130 having refractive index $n_1$ and a second member 135 of said transparent rotor having refractive index $n_2$. The boundary 125 optionally having optical coatings to suppress Fresnel reflections. The boundary 125 of the transparent rotor is where active steering of the light ray 110 occurs.

By means of propagation the light next encounters said thin fluidic lubricating layer 120 again but now said lubricating layer is positioned between a second surface 132 of said second member 135 of the rotor having refractive index $n_2$ and the first surface 122 of a second member 145 of said transparent stator having refractive index $n_2$. Again optional optical coatings are on the surfaces 132 and 122 to suppress Fresnel reflections from said lubricating layer having refractive index $n_3$.

Light passing through the lubricating layer 120 mostly undergoes a null refraction process whereby the optical momentum of the light is unchanged and where very small displacements of the light occur. The displacements of the light rays approaching zero as the thickness of the layer of lubricant 120 approaches zero.

Finally, by means of propagation the light encounters a second surface 155 of said second member of said transparent stator 145. Surface 155 having optional optical coatings as needed to suppress Fresnel reflections. The result is a ray of light 115 that is in a different direction than the input light 110.

Said first member of said transparent rotor 130 and said second member 135 of said transparent rotor being joined together permanently at the boundary 125 during the manufacturing process. Said first member of said transparent stator 140 and said second member of said stator 145 also being joined together permanently at the boundary 156 during the manufacturing process.

The rotor is able to move relative to the stator by any one of a number of physical processes, as will be described later in this invention. The result of which is that the sunlight incident on the suntenna array 100 is redirected to a subsequent stage of processing by using a transmission mode process. The ray of light from each rotor may either be concentrated directly to a smaller area by having each rotor at a slightly different angle, or the light or may be maintained in the same general direction by giving all the rotors configured in essentially the same orientation.

Figure 2:
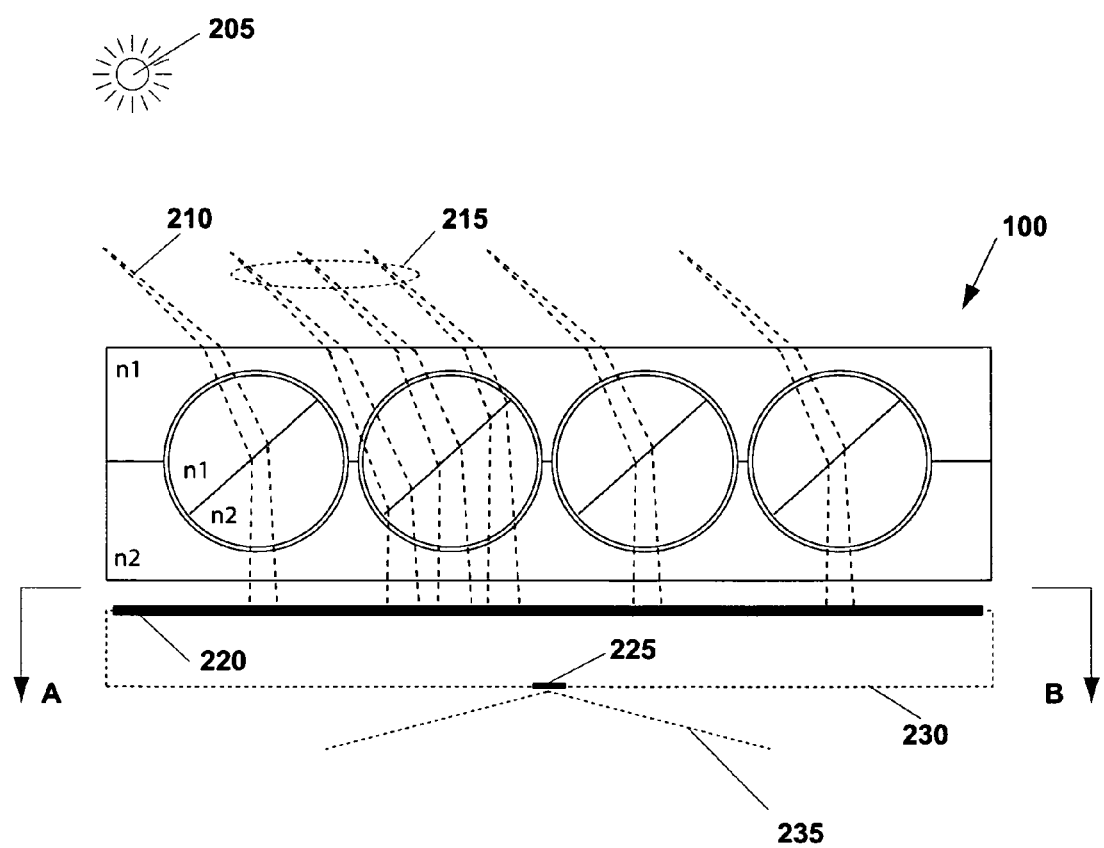
FIG. 2 shows in cross section the optical design for a transmission mode suntenna array evolving light-cones from the sun without regard to the method for actuation of the transparent rotor.

FIG. 2 shows the same embodiment 100 as FIG. 1, however, the solid angle of the light-cone 210 associated with the finite disk of the sun 205 is now accounted for in the cross sectional cut. A collection of the light-cones 215 clearly shows that even though said transparent rotor and said transparent stator have curved lens-like surfaces 121, 122, 131, and 132 the light is unaffected by said curved lens-like surfaces. Only the optical boundary 125 has any active and controllable effect on the flow of light energy.

Note that FIG. 2 schematically shows concentrating optical elements 230 below the demarcation line AB. The upper surface 220 is an input aperture and the lower surface 225 is the output surface for concentrated sunlight. Light 205 having a narrow solid-angle over the large area of the input surface 220 is transformed into light having a large sold angle 235 over a small concentrated area 225. This process cannot be achieved if the alignment of said transparent rotors is not within a narrow range of values. To achieve this narrow range of orientations a high performance actuator is required to precisely rotate said transparent rotors. The remaining part of the invention addresses integration of a means for actuating said transparent rotor relative to said transparent stator.

Figure 3:
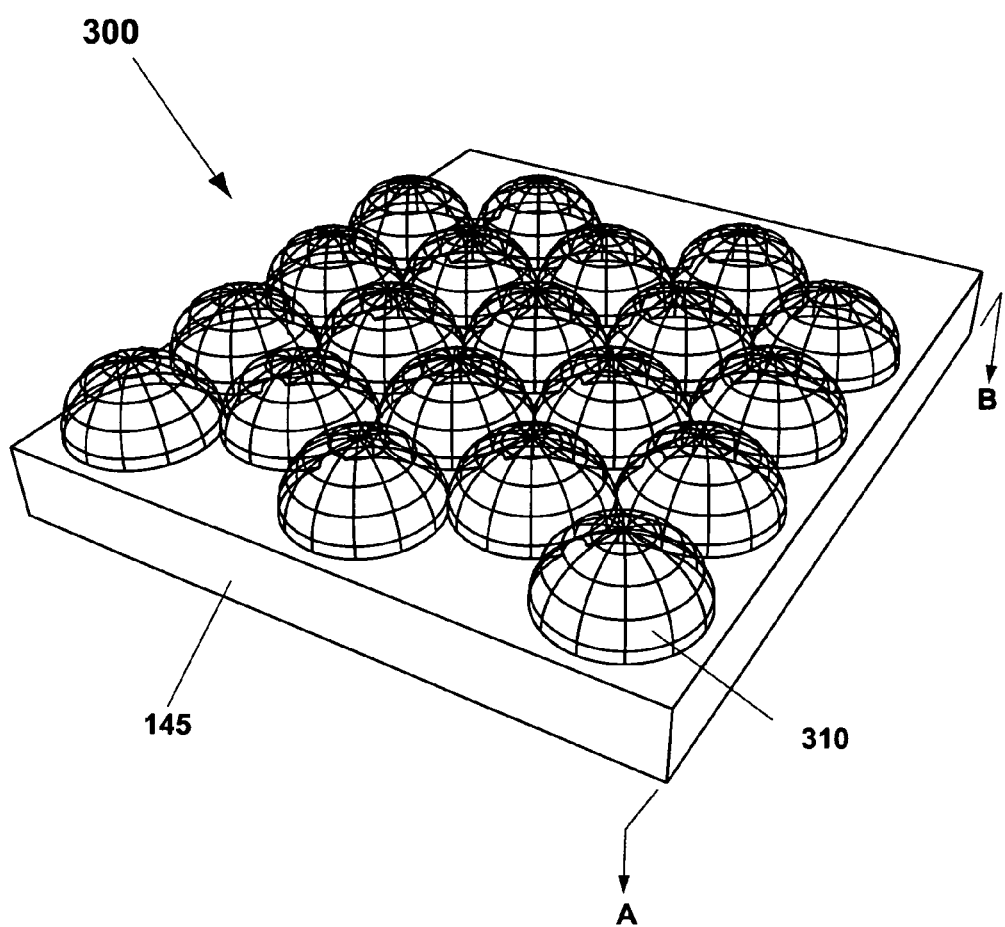
FIG. 3 shows in three dimensions an array of transparent and spherical suntenna rotors.

FIG. 3 shows an embodiment of the suntenna array 300 comprising rotors made from spheres of dielectric 310.

Figure 4:
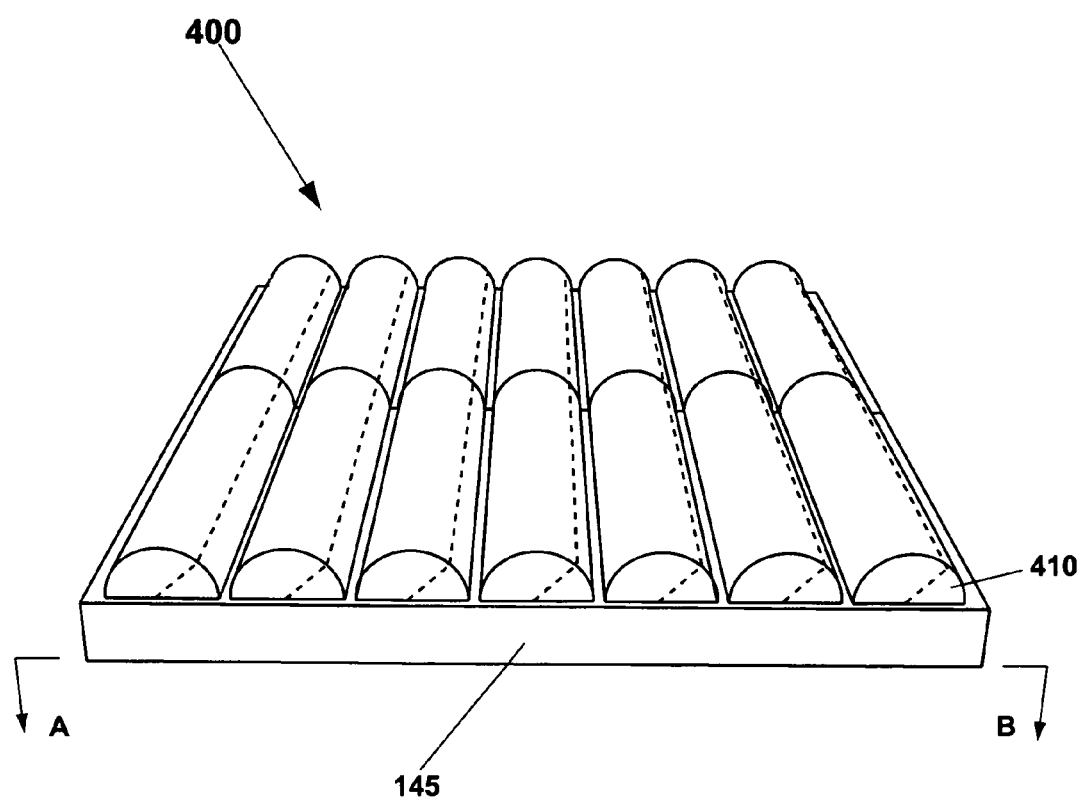
FIG. 4 shows in three dimensions an array of transparent and cylindrical suntenna rotors.

FIG. 4 shows an embodiment of the suntenna array 400 comprising rotors made from cylinders of dielectric 410.

Figure 5A:
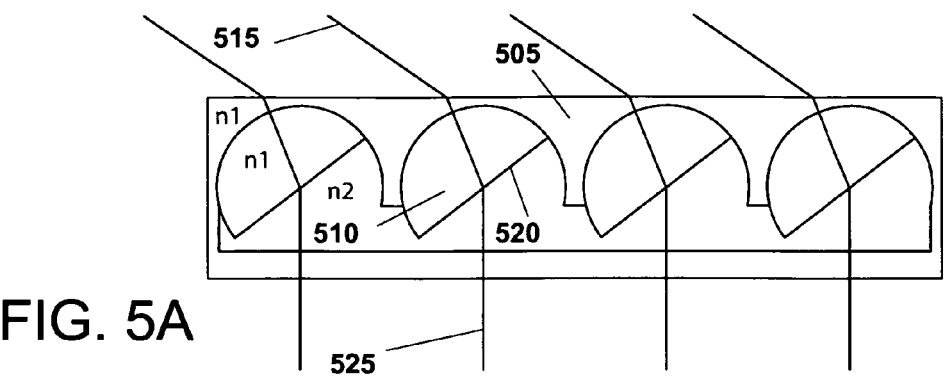
FIG. 5A shows a specific implementation of refractive light steering where one half of the optical rotor is a solid and transparent dielectric and the other half is air.
Figure 5B:
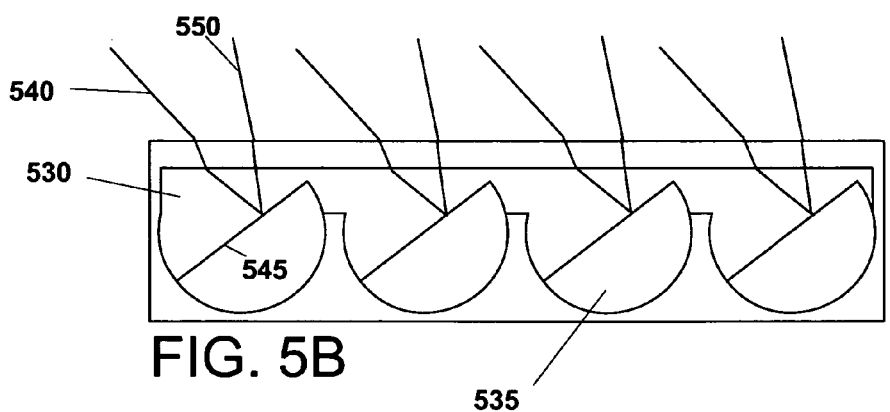
FIG. 5B shows a specific implementation of reflective light steering where one half of the optical rotor is a solid and transparent dielectric and the other half is air.
Figures 5C, 5D:
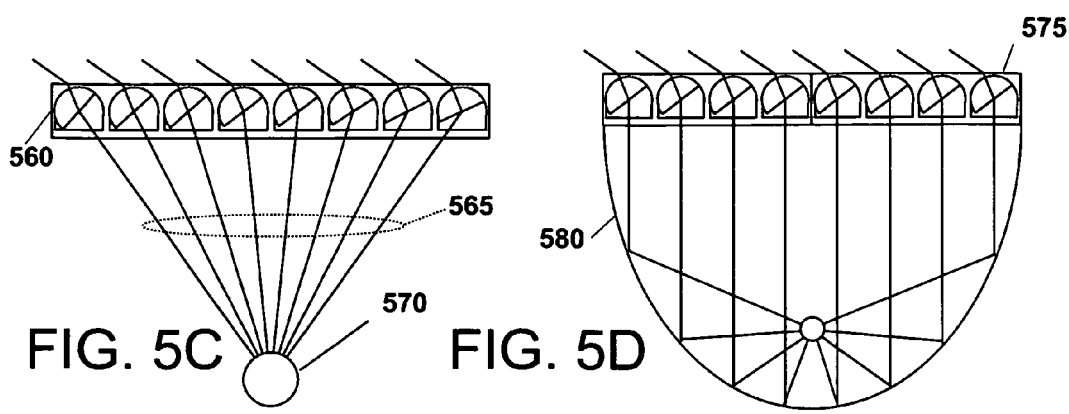
FIG. 5C shows a specific implementation of refractive light steering where the objective is to concentrate light.
FIG. 5D shows a yet another implementation of refractive light steering where the objective is to concentrate light.

FIG. 5A shows a variation on the theme of using media with two different refractive media to steer light. The distinguishing feature here is that the first medium 505 is a solid and the second medium 510 is a gas or a liquid. The light input 515 is steered by refraction at interface 520 to an output 525. FIG. 5B shows a variation on the theme of using media with two different refractive media to steer light. The distinguishing feature here is that the first medium 530 is a gas or liquid and the second medium 535 is a solid. The light input 540 is steered by reflection at interface 545 to an output 550. FIG. 5C and FIG. 5D show two different embodiments for obtaining concentrated sunlight. In particular, FIG. 5C shows an array of optical rotors 560 each having a slightly different orientation in order to steer and focus light 565 to a receiver 570. In FIG. 5D the array of optical rotors 575 is oriented so that that light is optimally coupled into a subsequent concentrator 580. The concentrator 580 may take one of many possible forms that are known to those familiar with the art of optics.

Figure 6A:
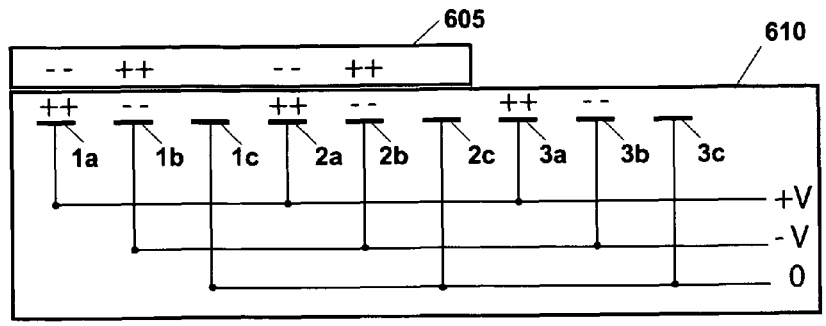
FIGS. 6A-6D shows prior art of the required electrodes and voltages needed for moving a slider relative to a stator in a time sequence of steps with electrodes not independent of each other.

FIG. 6A In particular, this figure shows a slider 505 having bulk resistivity of $10^9 \Omega \cdot cm$ to $10^{11} \Omega \cdot cm$ or equivalently $10^{13} \Omega/\text{square}$ to $10^{15} \Omega/\text{square}$. For the sake of comparison common glass has a bulk resistivity between $10^{12} \Omega \cdot cm$ to $10^{16} \Omega \cdot cm$, quartz has a bulk resistivity of about $10^{20} \Omega \cdot cm$, and pure Teflon has a bulk resistivity of between $10^{24} \Omega \cdot cm$ to $10^{26} \Omega \cdot cm$. Thus the slider 605 is very slightly conductive relative to pure glass—although there is some overlap. Furthermore, a set of voltages {−V, 0, +V} is applied to electrodes 1a, 1b, 1c, 2a, 2b, 2c, 3a, 3b, and 3c; which are located in the stator 610. These electrodes are organized into periodic sets called voltage phases. We will call these phases a, b, and c corresponding to what is shown in FIG. 6 for the names of the electrodes.

In the steady state condition of FIG. 6A each phase of the electrodes in the stator is assigned the voltage shown and a complementary charge distribution has been induced in the slider. Part of this induced charge distribution is due to polarization of the dielectric resulting in bound volume charges and bound surface charges in the slider 605; part of the induced charge is due to free charges induced due to the slight conductivity of the material. We are most concerned with the free charges because the bound charges respond almost instantaneously to voltage changes on the electrodes while the free charges respond with a time constant that is dependent on the resistivity and capacitance of the system and this will provide a means for inducing forces on the slider 605. The free charges are indicated in these figures using the symbols + and −. The sign of the induced charges in the slider 605 is opposite to that of the corresponding electrode in the stator 610 and the slider is strongly attracted to the stator. Frictional forces are thus at a maximum and the slider 605 in the electrostatic stepping motor is locked in place.

Figure 6B:
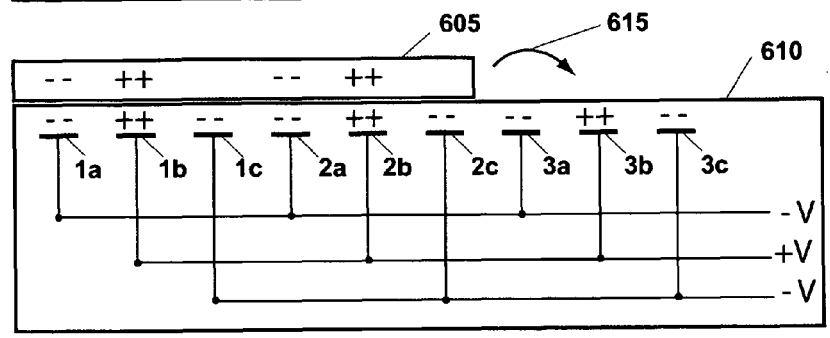

In FIG. 6B we see the situation just after an adjustment of electrode voltages as indicated. Three things have occurred: first the a and b phases have reversed polarity in the stator 610, second the accumulated charges in the slider 605 have started to respond to the stator electrode voltage changes but because of the relatively high resistivity the charges are taking a long time to respond and they have not appreciably changed from the steady-state condition, and three the c phase electrodes have changed to a polarity that dictates which direction the slider will move. In the case shown the c phase electrodes have take a negative charge and this will tug at the positive charges in the slider causing unbalanced tangential forces to exist on the slider 605 to the right. Had the c phase electrodes been reversed in polarity the unbalanced tangential force would have been to the left. Furthermore, the normal force on the slider is now directed away from the surface of the stator, thereby reducing friction and allowing the slider to step 615 in the direction set by the phase c electrodes. Note that the values of the voltages are typically in the range of 1000 volts, depending on the geometry involved.

Figure 6C:
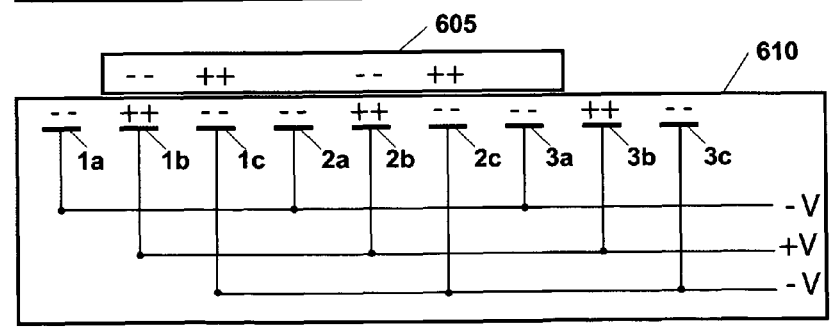

In FIG. 6C the slider's induced charged have still not changed very much from the steady state, even after the stepping motion 615 has occurred, due to the relatively large resistive properties of the material used to make the slider and the resulting resistive-capacitive time constant associated with the slider.

Figure 6D:
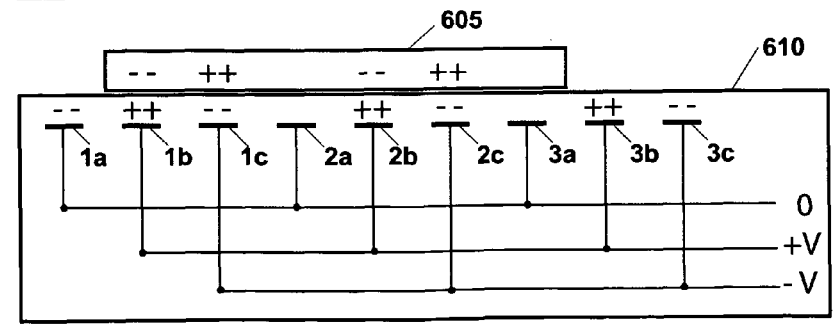

Finally, in FIG. 6D the phase a electrodes are grounded in preparation for the next cycle of voltage transitions and the next step of the stepping motor. As can be seen each phase gets a chance to specify the direction of travel for the slider; the functions of each phase permutates cyclically every three steps. The main point to be take from this analysis is that each phase provides two services: either changing the normal force from attractive to repulsive or selecting the direction of travel by inducing a perturbation tugging force to the left or to the right on the slider, depending on the desired direction of travel. Also, carefully note that the pattern of induced charges has not changed at all in the slider during the execution of the stepping process. This means that there is little ohmic loss in the slider in this configuration.

Unfortunately, there are also three phases that need to be physically wired to make the system work. Additionally, the full area of the slider is not charged so that this prior art has built in inefficiencies. A new type of stepping motor is needed to put into practice the unique properties of the suntenna and suntenna array. To achieve a high level of optical rotor pointing precision a new type of low-power, transistor-driven, transparent electrostatic stepping motor is now described.

Figure 7A:
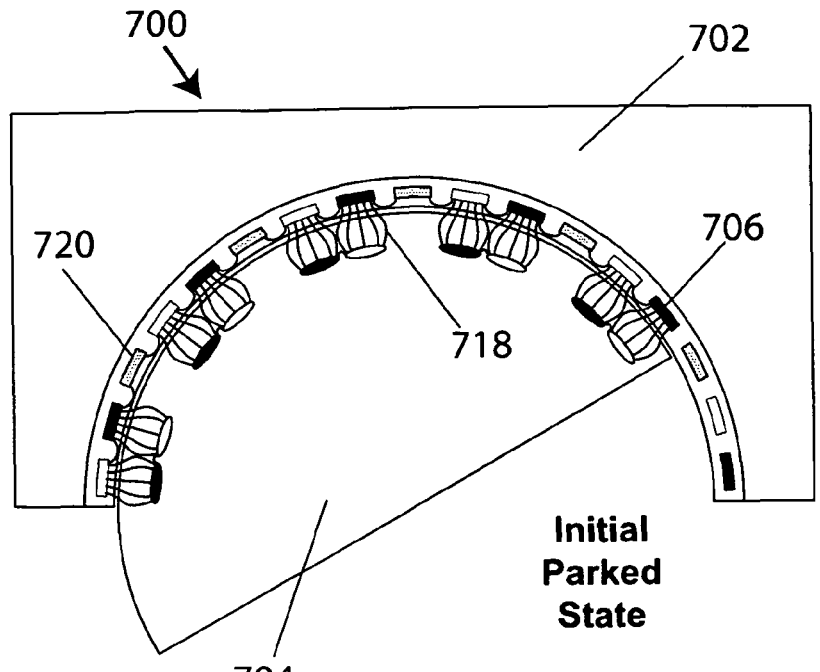
FIG. 7A shows the parked state electric fields of a hemispherical rotor relative to an optical stator.
Figure 7B:
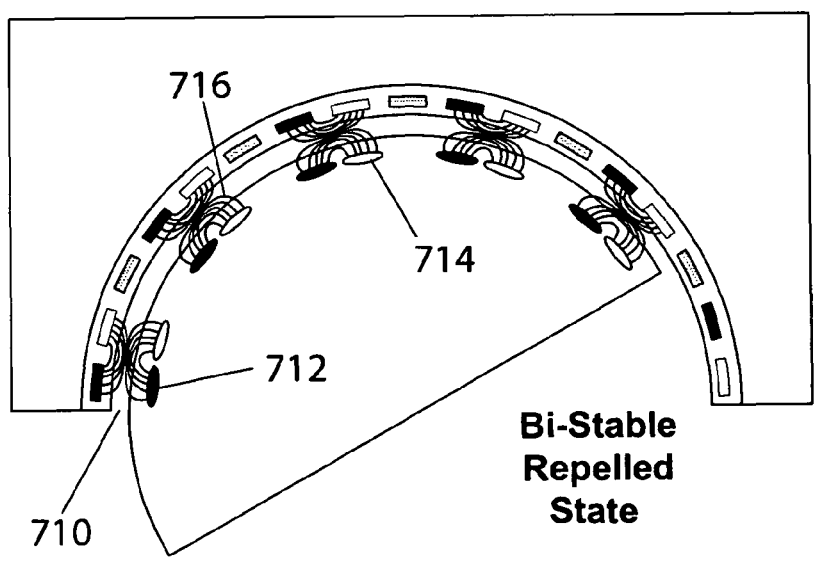
FIG. 7B shows the bi-stable state electric fields of a hemispherical rotor relative to an optical stator.
Figure 8A:
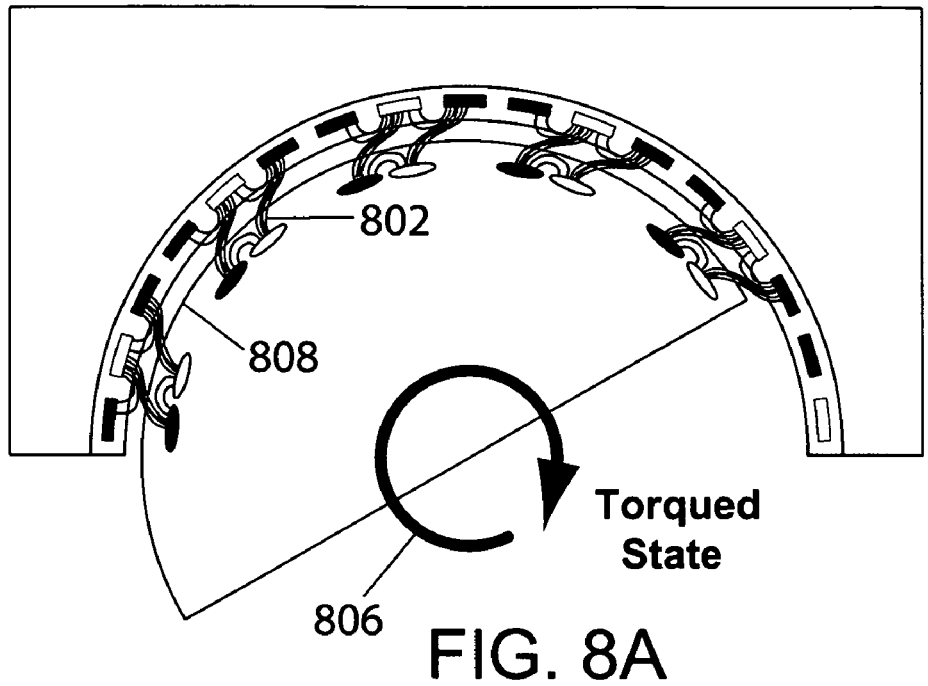
FIG. 8A shows the torqued state electric fields of a hemispherical rotor relative to an optical stator.
Figure 8B:
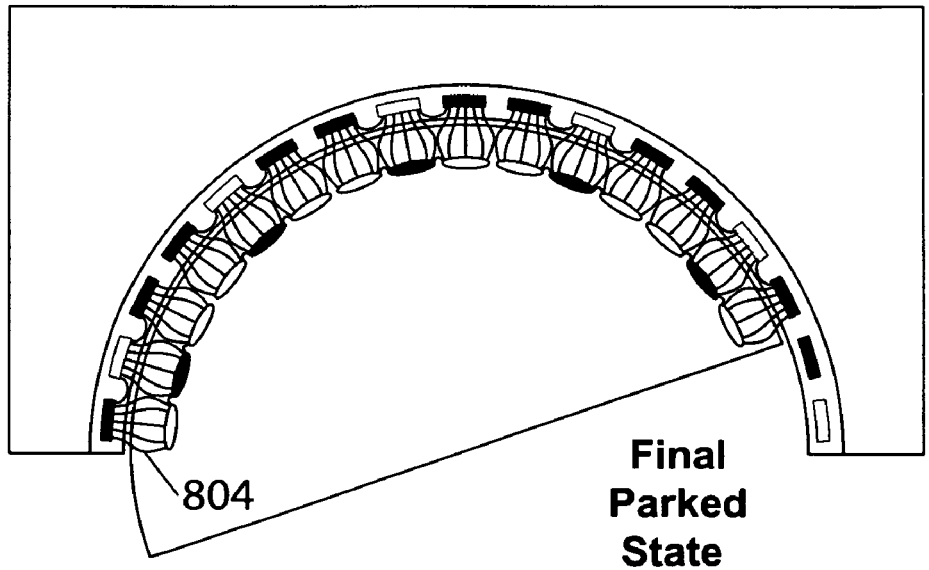
FIG. 8B shows the final parked state electric fields of a hemispherical rotor relative to an optical stator.

FIGS. 7A-B shows the electrostatic stepping motor before and just prior to rotation FIGS. 8A-B shows the actuated stepping motor during and just after stepping. These figures are for a particular slice through the entire device and different cuts through the device would provide different views of the actuation process. The electrostatic stepping motor 700, also called a sun tracker in solar applications, actually comprises the optical stator 702 and optical rotor 704 already described. It uses voltages on transparent electrodes 706 to induce forces that drive the optical rotor 704 into alignment with the radiation from the Sun.

In particular, a typical optical rotor 704 has a conductivity on the order of $10^{-11}$ S·m$^{-1}$ and the optical stator 702 typically about 10× more surface conductivity. The electrodes 706 are arranged to induce forces and torques on the optical rotor by the application of voltages on the electrodes, which induce electric fields, such as 716, 718, 802 and 804. Highly conducting and transparent electrodes are located just beneath the inside surface of the optical stator and juxtaposed to the optical rotor. The optical rotor and optical stator are separated by a very thin air (or vacuum) gap 710. The minimum gap is on the order of 50 µm and is always present, even when the optical rotor 704 and optical stator 702 are in "contact" with each other, due to the inevitable small manufacturing imperfections of the surfaces. The optical rotor essentially rides on an electric force-field located in the gap region.

There are no electrodes on the optical rotor, however, virtual electrodes, as exemplified by negative potential electrode 712 and positive potential electrode 714, are induced on the optical rotor by electrical means. When a simple smooth and highly conducting stator electrode is energized by a step in its terminal voltage it immediately (~$10^{-18}$ s) induces electric fields, such as 716, 718, 802 and 804, and a bound charge polarization in the surrounding transparent dielectrics. In addition the bound volume charges there are also bound surfaces charges on the curved surfaces of the optical rotor and optical stator as well as at the boundary between the conducting electrode and the lossy dielectric of the optical stator. Furthermore, because the optical rotor 704 and optical stator 702 are made from homogenous materials, such as a glass or plastic, which has no internal gradients in material properties, there are no bound volume charges even though there are significant volume polarizations. Thus the only type of bound charges, such as 712 and 714, which are surface charges that contribute to the total electric field in and around the optical rotor.

In addition to the bound polarization charges just mentioned there are also free relaxation and migration charges that are induced onto the boundaries between different media. These relaxation charges are strictly a result of the abrupt changes or gradients in a non-zero conductivity and permittivity at boundaries and non-zero electric fields, which induce charge migration to the surface where step changes in the material properties occur. The situation is rather complicated: induced free charges on both the optical stator 702 and optical rotor 704 in turn modify the fields and bound charges within the dielectric of the sun tracker and the new electric fields and bound charges further modify the free and bound charges, and so on in an infinite regression, until a steady-state convergence is reached shortly thereafter.

The critical observation is that free charges of the same sign as on the conductive stator electrodes are induced onto the stator's dielectric-air boundary, while the opposite sign charge distribution is induced on the optical rotor's dielectric-air boundary. Unlike a simple capacitor the magnitude of the induced free charges on the optical stator and optical rotor are not in general equal and their determination requires a full field numerical transient time analysis. Additionally, the sign of the free charges is opposite to that of the bound charges and some net cancellation is possible at the surfaces. The charges that are induced on the surface of the optical rotor take about five optical rotor time constants to migrate into place from the surrounding medium. Furthermore, the resulting island of free charges also has a persistence or memory even after the original energizing voltage is removed. Thus a virtual electrode is formed with a charge distribution that slowly and exponentially decays in time.

The forces and torques 806 that are induced on the optical rotor are a consequence of these bound and free charge distributions and can only be found accurately from numerically evaluating the Maxwell stress-energy tensor. This is a computationally intensive description that connects the electric fields to the continuum dynamics of ponderable media, like the optical rotor.

There are two main components to the forces on the optical rotor. The first is due to gradients of electric fields (fringing fields) in the polarized dielectric media of the optical rotor—these are called Kelvin polarization forces. The Kelvin forces are not part of the well known Lorentz force law, but are a contribution from a more general theory of electroquasistatic (EQS) forces on ponderable media of a continuum. The second electrical force contribution is due to Coulomb forces from time dependent and unbound (free) relaxation charges.

Furthermore, it is important to appreciate that the free relaxation charges on each dielectric surface have a time constant associated with them because each boundary has associated with it a time constant that depends on the distinct material conductivity and permittivity on each side of a boundary. Charges migrate to a step discontinuous boundary, such as 808, under the influence of external applied electric fields and then saturate the boundary with free charges after a few time constants have elapsed. The time constants associated with a boundary are controlled by the appropriate choice of materials, resistive coatings, and dopants in either the optical rotor, optical stator, or both. Therefore, the canonical time profile of forces and torques resulting from a step input in electrode voltage is under the control of the designer, and none of which is intuitively obvious to the casually trained observer of the art.

Keeping all of this in mind we can now state the basic strategy for actuation of optical rotors. It is based on the idea of electronically controlled EQS forces similar to "static cling" as one might find between two pieces of clothing after being removed from a hot dryer. However, unlike clothes that experience unpredictable forces from random charge distributions we will control the charge distributions and forces on the optics using an active matrix of transistors, described shortly, in order to induce precision sun tracking. This electronic control will extend over the entire extent of a solar collection array, which may be many tens of thousands of square meters.

FIGS. 7-8 show a time sequence for the rotation of an optical rotor 704 relative to an optical stator 702. In particular, an arrangement of energized electrodes over a hemisphere shaped optical rotor. The initial parked state FIG. 7A is set just prior to the actual actuation process. The state maintains the optical rotor in a fixed position with all the electrical and gravitational forces on it are in equilibrium. It also sets up a pattern of voltages that can eventually be turned into asymmetrical patterns of voltages. As will be shown in subsequent figures the voltages need not be symmetric or coordinated into two or three phases, as has been the restriction of all prior art. However, for simplicity in FIGS. 7-8 the optical stator electrodes have been given a repeating pattern of voltages characterized by the sequence such as $\{+V, -V, 0\}$ in a particular direction. At steady state the boundary between the optical stator and the air gap has saturated with free charges in the repeating sequence $\{+Q, -Q, 0\}$. The boundary between the air gap and the optical rotor has sign-reversed free charges $\{-Q, +Q, 0\}$ induced on it. Therefore, by Coulomb's law of charge attraction the optical rotor is attracted to the optical stator. Additional Kelvin polarization forces are also assisting in this process of attraction. The optical rotor is therefore strongly attracted to the optical stator and the air gap is minimized.

In FIG. 7B the electrode polarity, exemplified by 706, is quickly reversed from the configuration in FIG. 7A. This causes a fast change of the free charge distribution on the optical stator 702 because by design it has a fast boundary time constant. However, the optical rotor has, by design, a lower surface conductivity so that the charge relaxation process is slower on the optical rotor boundary with the air gap. Therefore, in a very short time after electrodes' polarity changes the boundary charges at the stator-air boundary come to match the charges at the rotor-air boundary at each electrode position and a large unbalanced Coulomb repulsion force is developed. The parked optical rotor, FIG. B7A, then begins to accelerate away from the optical stator creating a larger air gap 710. However, because of the even symmetry of the charge distribution there is no biased direction for the optical rotor to turn. In fact, it is a bi-stable system, FIG. 7B, that can rotate in either of two directions depending on any external random perturbations to the optical rotor. This is an unstable mechanical system, yet, by putting the art into practice, it is also highly controllable.

To control the direction of rotation of the optical rotor, and to also place it into a new parked state, requires that the unused electrodes, such as 720, which had originally been biased to zero volts in FIG. 7A, are now selected to all be either +V or -V, depending on the desired direction of rotation of the optical rotor. We shall call this the direction-selection voltage and it induces charges at the optical stator and air gap boundary that rotate the optical rotor through a short unit hop or step. The electric fields that result from the application of the direction-selection voltage are shown in FIG. 8A.

As the real electrodes and the virtual electrodes become aligned, the system energy is minimized, and the torque goes to zero. Furthermore, the repulsive force is now replaced by an attractive force and the air (vacuum) gap decreases until the optical rotor is in a new parked state, as indicated in FIG. 8B. The process repeats as needed until the optical rotor is in the desired final position.

The steps just described have constant amplitude voltages placed on the real electrodes at the same time steps. This was appropriate for rotations through the angle associated with a single electrode spacing. The description was essentially that of a fully digital algorithm, which is useful for unit stepping. However, by using a smaller magnitude at each real electrode around the optical stator in then the gap is made smaller and the rotor will rotate a smaller distance. Also, by using a smaller magnitude voltage on the direction-select electrode then the torquing is made smaller, which also causes a smaller step size to be taken—this is called Fractional Step Actuation (FSA). This is useful for fine position adjustments. Clearly the use of time and amplitude for FSA is quite possible; however, the price that is paid is a more complicated stepping algorithm and a greater susceptibility to imperfections in the step size because the actuation algorithm now depends on more parameters. Nonetheless, the added complexity in the algorithm and initial development that this entails may be considered an acceptable tradeoff because it reduces hardware complexity and cost.

The relative simplicity of the actuation scheme just outlined above is complicated in practice by the need to minimize the number of electrodes used in each optical rotor. Precision steering with at least 0.1 degrees of angular resolution is needed for the optical rotor in both azimuth and elevation to achieve a sunlight concentration of about 500× and a PV efficiency of 40% or more. To achieve this precision with an optical rotor having a diameter of 10 mm would require electrodes to be on a 10 micron grid. This would, very roughly, result in needing to use 3 million electrodes per optical rotor. Although smaller optical rotors are ultimately desired the scale of the problem does not change appreciably: it is the same scale of engineering used in the making of a Charge Coupled Device (CCD) camera and for this application it is currently considered too expensive and fabrication intensive to be practical—especially if voltage levels on each electrode are in the range of 1 kV. For a single square meter panel-array, which has about 10,000 individual optical rotor elements, this would require about 30 billion transparent electrodes per square meter—and, as will be discussed later, it would also require another 30 billion transparent transistors. Clearly, the problem becomes less troublesome per optical rotor as the optical rotors become smaller in size, but then more array elements are needed per square meter and large numbers of electrodes (and transistors) are still required.

Therefore, one of the objectives herein is to describe a means to efficiently overcome the problem of a large electrode count. As a matter of practical engineering judgment an optical rotor using between 256 to 1024 electrodes on its optical stator is considered reasonable. The ultimate number chosen is a strong function of the drive voltages utilized and the practical size of transistor drive electronics. This is a reduction of 4 orders of magnitude from the simple arrangement already considered. Such a reduction in hardware complexity requires that larger electrodes are used to fill up the optical stator surface area. Furthermore, such an approach mandates that only a small fraction of an actuation step is taken per optical rotor adjustment. This means that the absolute values of each angular step taken by the optical rotor is still maintained at about 0.1 degrees, while the relative step size, when compared to the size of an electrode, is now much smaller than unity.

Yet another of our objectives is to provide sufficient static and dynamic control forces using relatively small magnitude control voltages on the optical stator drive electrodes. This is of particular concern because calculations show that simple flat electrodes can only provide a force of attraction that is about equal to the weight of the optical rotor at voltage magnitudes of about 1 kV for an optical rotor having a diameter of 10 mm. This is not sufficient for actuation or even parking the optical rotor reliably and therefore a means for significantly increasing the electrode self capacitance is therefore needed so that forces of at least 10× the optical weight are available over the complete range of operating conditions—including low electrode voltages and relatively large gaps between the optical rotor and optical stator during an actuation step, and when the optical rotor is at its maximum zenith angle of rotation. Even greater levels of force would provide a greater ability to control the optical rotor dynamics.

Figure 9:
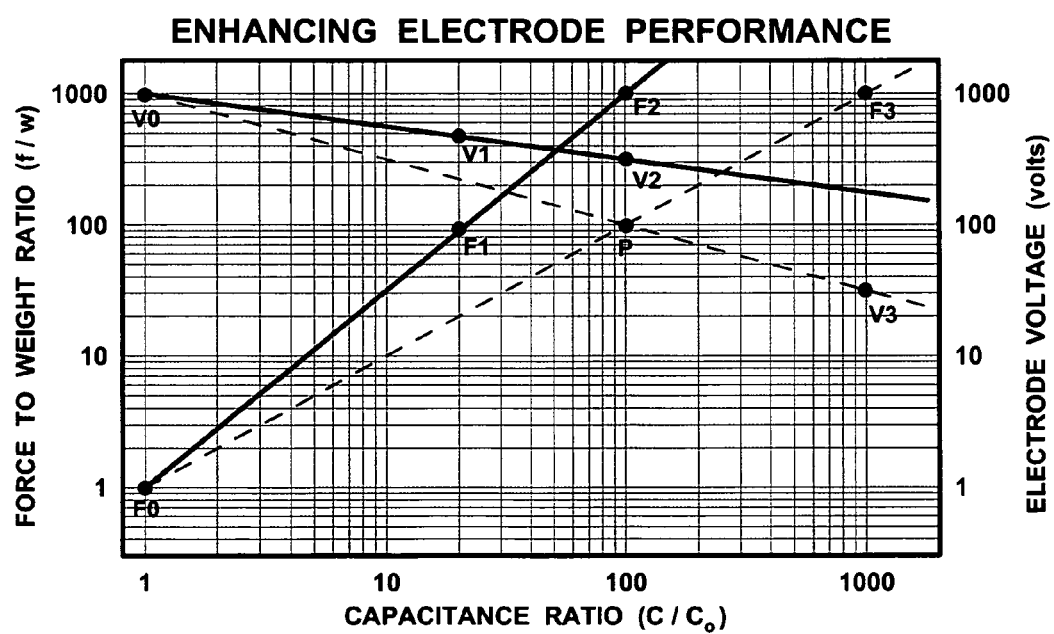
FIG. 9 shows a graph of the improvement in forces and required voltages as a function of capacitance.

FIG. 9 shows how a baseline optical rotor configuration has its force and voltage performance scale with increased electrode capacitance. In particular, the canonical optical rotor that we have chosen to analyze consists of an optical rotor with a diameter of about 10 mm, a stator-to-rotor gap distance of about 38 µm, electrodes embedded underneath the stator also at a distance of 38/cm, individual square electrodes of approximately 700 µm×700 µm, 283 individual optical stator electrodes and characteristic free charge migration time-constant on the order of 1 second. Such a canonical configuration was chosen because it approximately provides a net static "parking" force on the optical rotor equal to the weight of the rotor when using 1 kv of alternating positive and negative voltages on the actuation electrodes.

In particular, for FIG. 9 a Method of Moments computer simulation of the electric fields was obtained for a baseline optical rotor 704 driven with 1 kv electrodes located in the optical stator 702. This provided the initial voltage point V0 and force to weight ratio at F0. There are an infinite number of ways to distribute the improved electrode capacitance, four different cases are examined above for a fixed stator-to-rotor spacing of 38/cm. Case 1: V1 and F1 show that a 20:1 capacitance improvement (due to 20:1 increase in surface area from pulled carbon nanotubes) can increase the force by 100:1 while decreasing the voltage by 2:1. Case 2: V2 and F2 shows a 1000:1 force increase a 3:1 decrease in required electrode voltage. Case 3: also shows a 1000:1 increase in the force while almost reducing the voltages to CMOS compatible levels. Case 4: P shows an easy to remember intermediate case.

Capacitance is a strong function of electrode geometry, therefore the capacitance axis described in FIG. 9 represents a changing electrode morphology. From the figure it is clear that an increase in the electrical surface area by 1000:1 would provide an excellent level of performance. It would provide a three order of magnitude increase in the force and a two order of magnitude decrease in the voltage. Such dramatic performance gains can only come about by using new technologies and materials to affect a change in the electrode morphology, none of which is familiar to the casual practitioner of the art.

Therefore, the careful design and selection of materials used in fabricating the electrodes is critical for precision actuation of an optical rotor. In particular, if the increased surface area of a conductive, transparent, electrode can be found to increase the effective area of a capacitor then its capacitance will increase, the drive voltage will decrease, and the actuation forces will increase. The strategy is to use part of the capacitance increase for increasing the force-to-weight ratio and part of the capacitance increase is for reducing the dive voltage. Therefore, one objective of this teaching is to provide a means to increase the electrostatic force to optical rotor weight ratio from 1:1 to 1000:1 and the decrease the magnitude of electrode voltages to standard CMOS compatible levels of about 10 volts.

It is possible to achieve this increased electrode surface area and capacitance using designer materials like, but not limited to, Carbon Nanotubes (CNT), which have been studied extensively for their potential in increasing the performance of ultra-capacitors. A single-walled carbon nanotubes (SWNT) can have a length of 1 mm or longer, a high specific surface area of greater than 1,000 $m^2 \cdot g^{-1}$ and a carbon purity of 99.9% or higher, and are aligned into a "forest" morphology. Conventionally grown CNTs are typically a low-density material, which only occupy 4% of the forest volume. There are many evolving processing techniques to organize CNT strands, for example, when specially prepared SWNT are immersed in a solvent and dried, the effect is to draw the nanotubes together in a self-assembly process. This process is due to surface tension of the solvent and the Van der Waals forces between the carbon nanotubes. The resulting "zipping" effect aligns the nanotubes into a dense array having an effective density of about 0.5 $g \cdot cm^{-3}$ or more. Alternately, if the fabrication of the SWCN is done in a prepacked forest arrangement then there are cross links formed between the individual SWCT. Such cross links can be used to allow thin transparent ribbons of SWCT to be drawn.

For example, consider a 1 $mm^2$ electrode having a thickness of 100 µm and a typical specific surface area of 1,000 $m^2 \cdot g^{-1}$ could therefore provide an effective surface area of up to 50,000 $mm^2$ if coated in a SWNT forest. The CNT forest structure is typically opaque and therefore requires further processing to make it transparent. In particular, it has been found that by pulling a dense packed CNT forest into a 2-dimensional transparent ribbon it is possible to obtain a thin and effectively transparent ribbon of CNT strands. Therefore, because of the 2-dimensional form it is expected to reduce the effective area by a factor proportional to $(50,000)^{2/3}$ or about 1,357 $mm^2$ maximum possible area. Now the resulting CNT is expected to exhibit cross links and surface-defect states that collectively can reduce the effectiveness of the conductive electrode mat in a complex way. However, just a 7% fraction of the maximum effective conductive area for charge collection would result in almost a factor of 100 improvement in an electrode's capacitance, while a 75% fraction of the maximum effective conductive area would achieve our objective of a factor of 1000× improvement. FIG. 9 shows some examples of how this improved effective area of the capacitor is used to increase the force to weight ratio and decrease the required drive voltage.

The significant improvement just discussed is precisely what is needed if a precision actuated optical rotor is to operate with impressed force to weight ratios of 100:1 and with voltages on the order of 100 volts instead of 1,000 volts or more. The lower voltage reduces the requirement on the transistor drive electronics. If more than 7% of the CNT stands preserve their area for use in the capacitive process then even CMOS compatible voltage levels could directly drive the optical rotor to steer sunlight into a non-imaging ultra-high efficiency concentrator so long as a means to individually control the CNT based electrodes existed To put the suntenna and suntenna array into practice, such a method is presented next.

Figure 10:
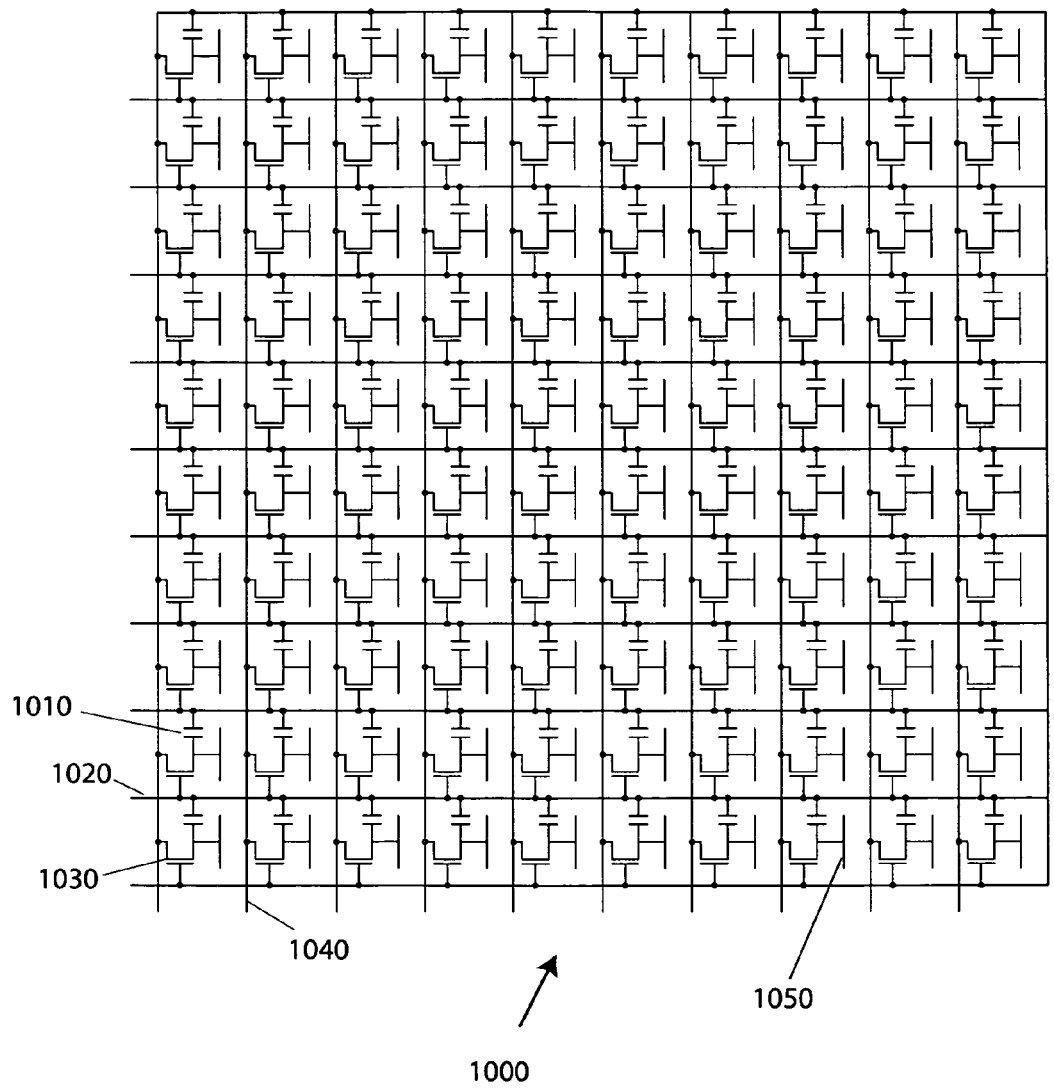
FIG. 10 shows a schematic of an optical rotor with co-located active matrix actuators.

FIGS. 10-13 The electrodes used to induce forces that hold the optical rotor in a parked state as well as provide torques for precision stepped actuation to track the sun are arranged in an active matrix array 1000 that surrounds each optical rotor. This is schematically shown in FIG. 10 and in top, side, and perspective views in FIGS. 11-13. The electrodes 1050 are located in the optical stator 702, juxtaposed to the optical rotor 704, and are attached to a transparent transistors 1030 and storage capacitors 1010 via a data lines 1040 and data-select lines 1020. With this arrangement the electrode can be energized in arbitrary spatial pattern over time. The electrodes 1050 correspond to electrodes, such as 720 and 706, in FIG. 7. The fields induced couple to the optical rotor 704 by means of virtual electrodes, such as 712 and 714.

More specifically, the electrodes 1050 are located a few tens to a few hundred microns away from the optical rotor, just beneath a protective inner surface of the optical stator 702. In order to drive the electrodes with an orchestrated time varying set of voltage signals an active-matrix transistor array 1000 is provided. The transistor array is located directly behind the electrode array, away from the optical rotor 704, in order to allow EQS fields direct access to the optical rotor 704. The active matrix array 1000 is similar in principle to an active matrix display that is commonly found on lap-top computers and other display devices. However, the transistors used herein are large and slow compared to those used in display devices because tracking the sun requires more precision than it needs speed. Additionally, by using CNT electrodes the signal voltages used in the active matrix display remain significantly less then 1 kV.

Figure 11:
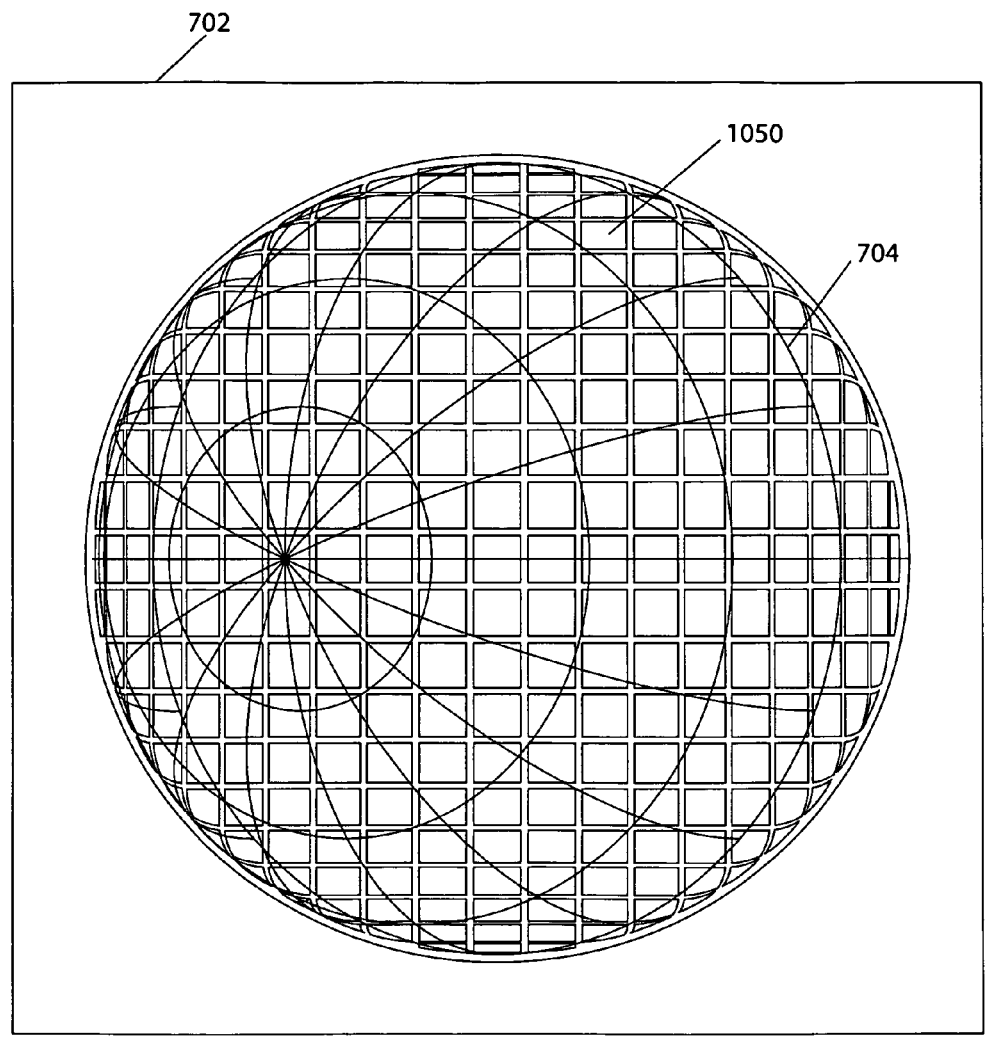
FIG. 11 shows a top view of an optical rotor and electrodes used in refraction based light steering.
Figure 12:
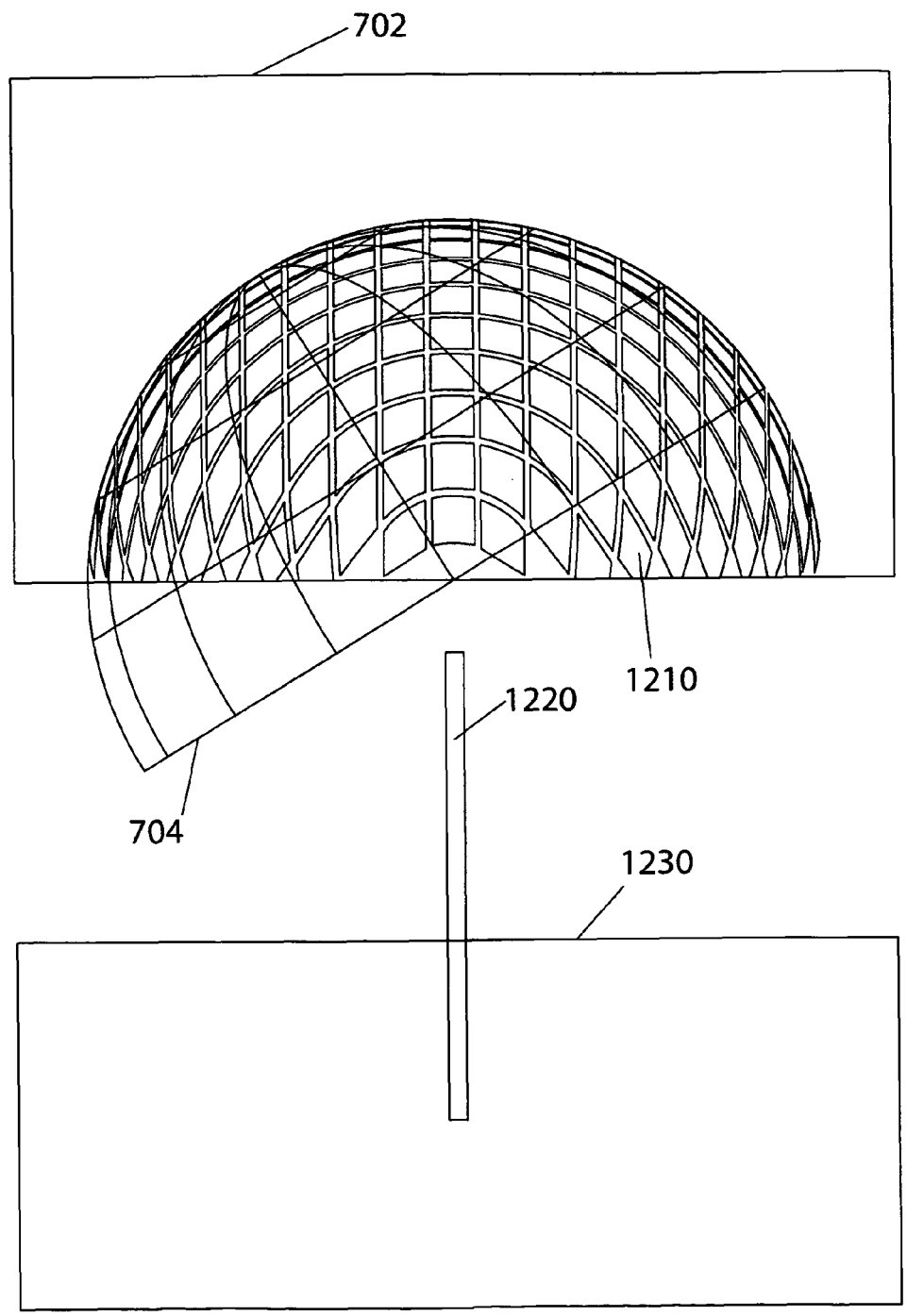
FIG. 12 shows a side view of an optical rotor and electrodes used in refraction based light steering.
Figure 13:
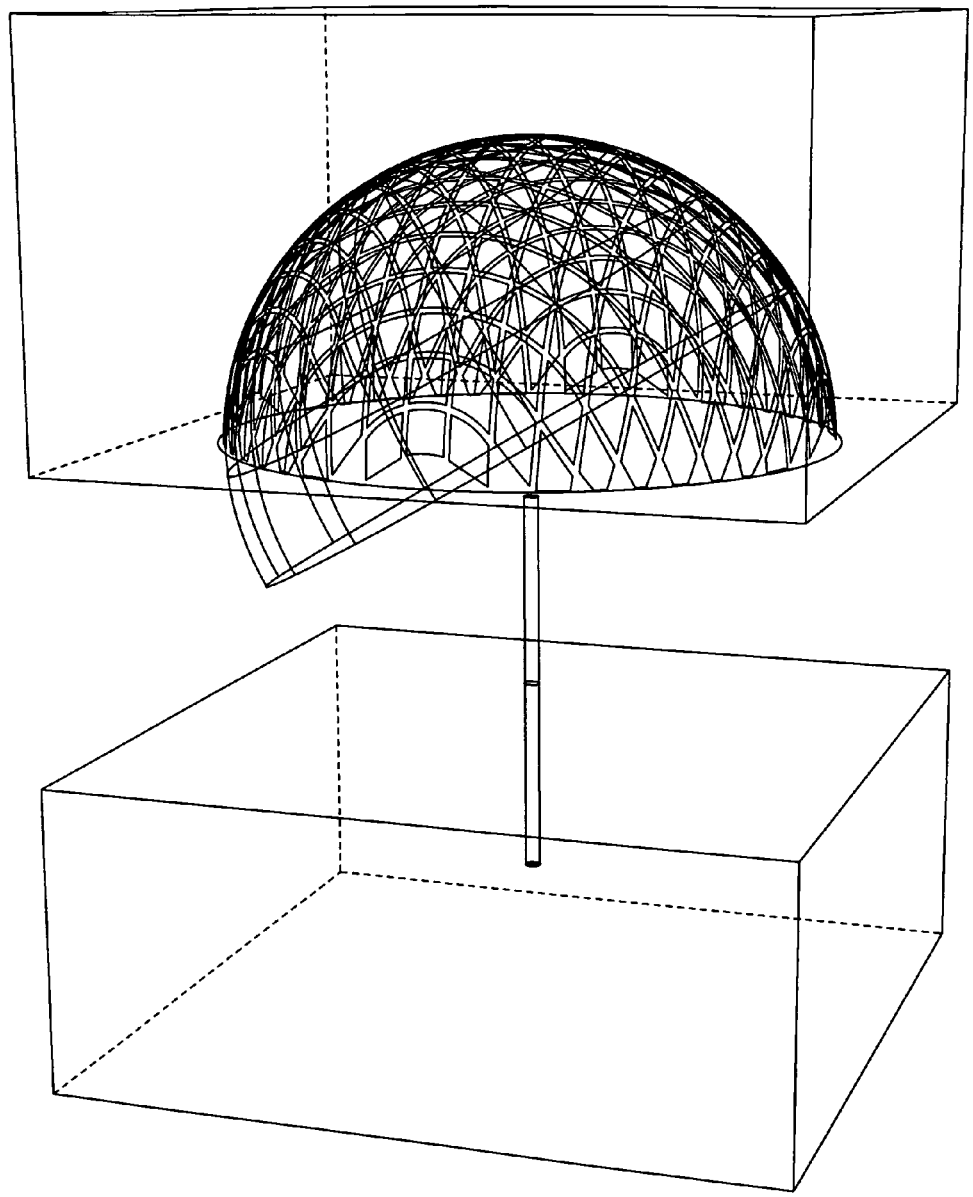
FIG. 13 shows a perspective view of an optical rotor and electrodes used in refraction based light steering.
Figure 14:
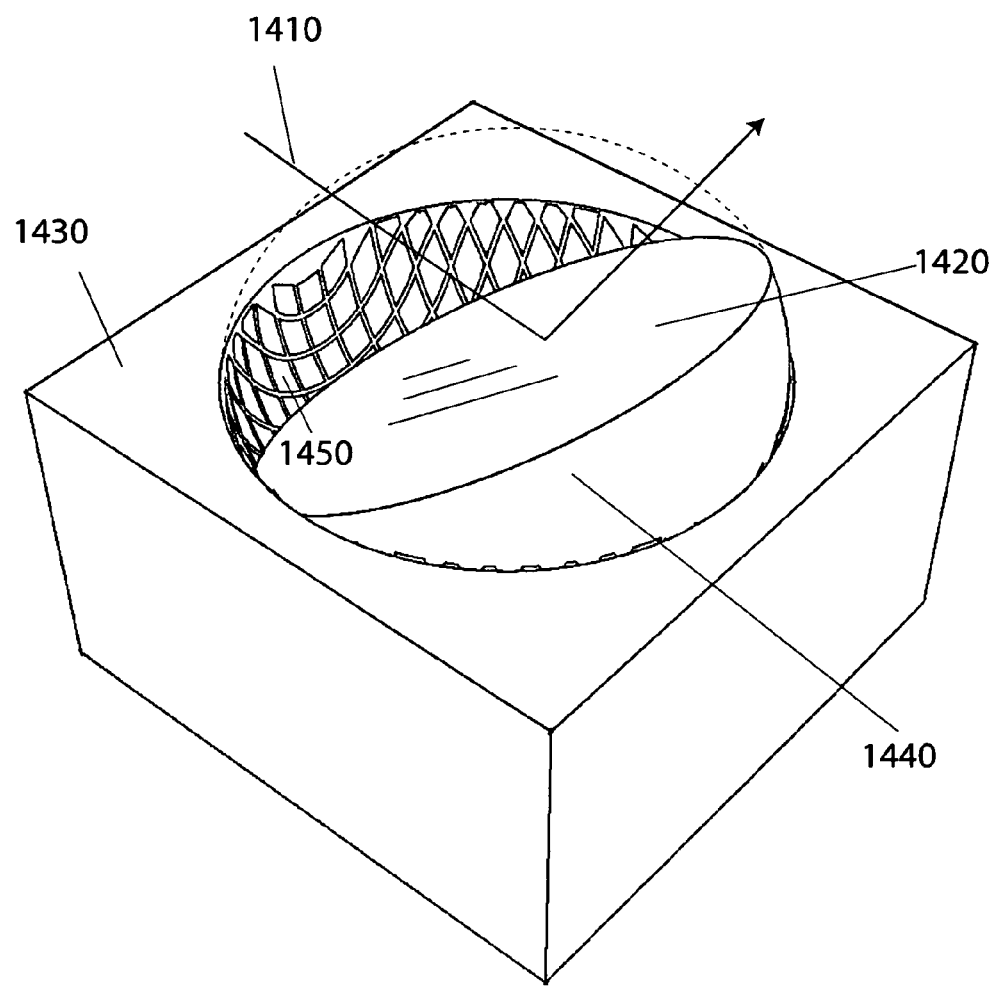
FIG. 14 shows a perspective view of an optical rotor and electrodes used in reflection based light steering.

FIG. 11 shows a top view of a single optical rotor and optical stator combination. FIG. 12 shows a side view of a single optical rotor and optical stator combination. FIG. 12 shows a perspective view of a single optical rotor and optical stator combination. Note that individual electrodes 1210 may have slightly different, non obvious shapes relative to neighboring electrodes due to the inability to map one-to-one a rectangular matrix onto a hemisphere. An optical rotor retention post 1220, is optionally located on subsequent optical devices 1230. The optical rotor retention post 1220 typically covers much less than 1% of the area and retains the optical rotor 704 in the proximity of the optical stator 702 even when no voltages are applied to the electrodes 1210.

FIG. B14 shows a reflective device comprising an optical stator 1430, a dielectric optical rotor 1440, which is covered in a reflecting material 1420 and actuated by an active matrix of electrodes 1450, whereby light 1410 is reflected off of the reflecting material 1420 towards a desired direction, typically for the purpose of energy extraction by a processes of concentration and thermal or photovoltaic action.

CONCLUSION, RAMIFICATION, AND SCOPE

Accordingly, the reader will see that this distinctly different invention for controlling the flow of solar energy or other light sources using an array of flat optical boundaries actuated by an active matrix of transistors which are coupled to electrodes in proximity to an optical rotor puts into practice the following advantages:
1. it permits a precision control of the redirection of the light;
2. it permits high concentration of sunlight to be achieved directly by using a plurality of rotors redirecting light to a common focal point;
3. it permits high concentration of sunlight to be achieved within an independent concentrating element;
4. it permits electronic tracking of the sun;
5. it permits thermal control by simple optical coatings on the stator and/or rotor;
6. it permits many prior art non-imaging concentrators to become tracking concentrators without the need for additional design;
7. it permits easy insertion into a building integrated optical system;

8. it permits easy insertion into any of number of structurally integrated optical systems, including but not limited to moving transportation vehicles and satellites;
9. it permits easy tracking of the sun for subsequent energy conversion processes;
10. it permits dynamic control of the process of actuation;
11. it permits sources of light, such as lamps, to have active control over concentration and direction of propagation.

While the above description contains much specificity, these should not be construed as limiting the scope of the invention but as merely providing illustrations of some of the presently preferred embodiments of this invention. The present invention is thus not limited to the embodiments described above, but can be changed or modified in various ways on the basis of the general principles of the invention, and such changes or modifications are not excluded from the scope of the invention. Thus the scope of the invention should be determined by the appended claims and their legal equivalents, and not by the examples given.

The invention claimed is:

1. A solid-state transmission-mode optical system for tracking a light source, comprising:
   a. a first member of a transparent rotor having a first refractive index and a first resistivity,
   b. a second member of said transparent rotor having a second refractive index and a second resistivity,
   c. a first member of a transparent stator also having said first refractive index and a third resistivity,
   d. a second member of said transparent stator also having said second refractive index and a fourth resistivity,
   e. a flat optical boundary positioned between said first and said second members of said transparent stator, and formed by a physically contiguous joining of said first and said second members of said transparent rotor, wherein said first refractive index is different from said second refractive index, and said first and second refractive indices are selected to enable refractive transmission of light across the optical boundary of said first and second members of said transparent rotor in a predetermined output direction for receiving refracted light from the light source,
   f. an array of real electrodes located on said first member of said transparent stator,
   g. an array of corresponding virtual electrodes located on said transparent rotor, wherein said virtual electrodes are induced over time by bound polarization charges in said transparent rotor and by free drift charges which move between said real electrodes on said transparent stator and said virtual electrodes on said transparent rotor,
   h. an array of transistor switches each connecting a respective one of said real electrodes to a voltage drive-signal source when a connect-signal is applied to a gate of the transistor switch, wherein said array of transistor switches hold charges constant on said real electrodes over extended periods of time to provide a stepped non-harmonic drive,
   whereby a combination of drive-signals and connect-signals induce time varying torques on said transparent rotor relative to said transparent stator, causing said flat optical boundary, between said first and said second members of said transparent stator to rotate so that light passing through said transparent rotor is refracted at said flat optical boundary within said optical rotor thereby causing light incident on said first transparent stator to be redirected to a desired output direction for subsequent concentration, distribution, or energy conversion.

2. The system in claim 1 wherein said electrodes are Carbon Nanotubes.
3. The system in claim 1 wherein said transistor switches are transparent.
4. The system in claim 1 wherein said transparent rotor is cylindrical.
5. The system in claim 1 wherein said transparent rotor is spherical.
6. The system in claim 1 wherein said redirected light is used to produce light at a user defined level of concentration.
7. The system in claim 1 wherein said redirected light is used to produce electricity.
8. The system in claim 1 wherein said redirected light is used to produce stored electrical energy.
9. The system in claim 1 wherein said means to induce a torque is based on electric forces.
10. The system in claim 1 wherein said rotor and said stator have a means to accurately determine absolute angular position relative to each other.
11. The system in claim 1 wherein said transparent rotor and said transparent stator contain optical coatings at one or more boundaries in order to suppress reflections and selectively suppress the passage of certain wavelengths of light.
12. The system in claim 1 wherein said redirected light is used to produce power.
13. The system in claim 1 wherein said optical rotor comprises two media.
14. The system in claim 13 wherein a first media is a solid and a second media is a non-solid.
15. The system in claim 13 wherein said optical rotor comprises a boundary between said first media and said second media.
16. The system in claim 13 wherein said optical rotor comprises a mirror between said first media and said second media.
17. The system in claim 13 wherein said optical rotor comprises a diffractive optical device between said first media and said second media.
18. The system in claim 13 wherein said optical rotor comprises a first media having a refractive index that is matched to a first optical media of said optical stator and a second media having a refractive index that is matched to a second optical media of said optical stator.

* * * * *